(12) United States Patent
Chien et al.

(10) Patent No.: US 11,307,418 B2
(45) Date of Patent: Apr. 19, 2022

(54) DISPLAY APPARATUS

(71) Applicant: Coretronic Corporation, Hsin-Chu (TW)

(72) Inventors: Hung-Ta Chien, Hsin-Chu (TW); Hsin-Hsiang Lo, Hsin-Chu (TW); Chuan-Chung Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/699,077

(22) Filed: Nov. 28, 2019

(65) Prior Publication Data

US 2020/0310123 A1 Oct. 1, 2020

(30) Foreign Application Priority Data

Mar. 28, 2019 (TW) .................................. 108110872

(51) Int. Cl.
| | | |
|---|---|---|
| *G09G 5/00* | (2006.01) | |
| *G02B 27/01* | (2006.01) | |
| *G02B 3/00* | (2006.01) | |
| *G02B 27/09* | (2006.01) | |

(52) U.S. Cl.
CPC ....... *G02B 27/0172* (2013.01); *G02B 3/0056* (2013.01); *G02B 27/0961* (2013.01); *G02B 3/0062* (2013.01); *G02B 2027/0118* (2013.01)

(58) Field of Classification Search
CPC .............. G02B 27/0172; G02B 3/0056; G02B 27/0961; G02B 2027/0118; G02B 3/0062
See application file for complete search history.

(56) References Cited

U.S. PATENT DOCUMENTS

| 2014/0218664 A1* | 8/2014 | Nimura | G02F 1/133526 349/95 |
|---|---|---|---|
| 2015/0042926 A1* | 2/2015 | Akasaka | G02F 1/133512 349/95 |
| 2015/0331280 A1* | 11/2015 | Wakabayashi | G02F 1/1339 349/57 |

(Continued)

FOREIGN PATENT DOCUMENTS

| CN | 101454721 | 6/2009 |
|---|---|---|
| CN | 103064136 | 4/2013 |

(Continued)

*Primary Examiner* — Adam J Snyder
(74) *Attorney, Agent, or Firm* — JCIPRNET

(57) ABSTRACT

A display apparatus includes a display element, a micro lens array, and a first light shielding element. The display element provides sub-image beams. The micro lens array is located in a transmission path of the sub-image beams, and has optical regions and first connection portions. Each first connecting portion is adapted to connect at least two adjacent optical regions, and each optical region is adapted to allow each sub-image beam to penetrate. The first light shielding element is located between the display element and the micro lens array, and has first light shielding regions and first light transmission regions. Each first light transmission region is disposed corresponding to each optical region and is adapted to allow each sub-image beam to penetrate. Each first light-shielding region is disposed corresponding to each first connecting portion and is adapted to prevent each sub-image beams from passing through each first connecting portion.

24 Claims, 20 Drawing Sheets

(56) References Cited

U.S. PATENT DOCUMENTS

2018/0164472 A1* 6/2018 Gao .......................... G09F 9/30
2019/0033642 A1* 1/2019 Haruyama ........... G09G 3/3677

FOREIGN PATENT DOCUMENTS

| | | |
|---|---|---|
| CN | 104407441 | 3/2015 |
| CN | 104407442 | 3/2015 |
| CN | 207148485 | 3/2018 |
| CN | 108428716 | 8/2018 |
| JP | 2004325546 A * 11/2004 | .......... G02F 1/1335 |
| TW | 201405172 | 2/2014 |
| TW | 201502588 | 1/2015 |
| TW | 201901241 | 1/2019 |

* cited by examiner

DISPLAY APPARATUS

CROSS-REFERENCE TO RELATED APPLICATION

This application claims the priority benefit of Taiwan application serial no. 108110872, filed on Mar. 28, 2019. The entirety of the above-mentioned patent application is hereby incorporated by reference herein and made a part of this specification.

BACKGROUND

Field of the Invention

The invention is directed to a display apparatus and more particularly, to a near eye display (NED) apparatus.

Description of Related Art

Along with development of display techniques and people's desire for high technology, near eye displays (NEDs) and head-mounted displays (HMDs) are products with great potential at present. Regarding applications related to the near eye display technique, the currently may be categorized into an augmented reality (AR) technique and a virtual reality (VR) technique. Therein, light field near eye displays (LFNEDs), as having current light field information, can solve an issue of vergence-accommodation conflict (VAC) to provide in-depth image information and can be applied to the AR technique and the VR technique of the near eye display techniques.

Generally, the LFNEDs can be categorized into two structures, i.e., a space-multiplexing structure and a time-multiplexing structure. A time-multiplexing LFNED uses a microelectromechanical device to change a location of a virtual image, thereby changing clearness degrees of foreground and background scenes, while a space-multiplexing LFNED uses a micro light-emitting diode (micro-LED), a micro organic light-emitting diode (micro-OLED) and a liquid crystal display (LCD) or other display elements to stack sub-images through an optical element (e.g., a mirolens array) on a retina of a user to form a disparity image, such that the user may view an in-depth image screen, which is referred to as an integral imaging technique.

However, in the currently existing integral imaging technique using the micro lens array, a junction of each sub-lens in the micro lens array usually has fillets in actual manufacturing or imperfect surfaces produced during other manufacturing processes, such that optical inactive regions incapable of achieving an originally schemed optical function may be produced. When light hits the optical inactive regions, the light cannot be propagated along a designed path, and stray light is formed, which causes degradation of imaging quality.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention provides a display apparatus capable of displaying a light field image with high image quality.

Other features and advantages of the invention can be further understood by the technical features disclosed in the invention.

To achieve one, part, or all of the objectives aforementioned or other objectives, an embodiment of the invention provides a display apparatus. The display apparatus is adapted to be disposed in front of at least one eye of a user and includes a display element, a micro lens array and a first light shielding element. The display element is configured to provide a plurality of sub-image beams. The micro lens array is located in a transmission path of the sub-image beams, wherein the micro lens array has a plurality of optical regions and a plurality of first connection portions. Each of the first connecting portions is adapted to connect at least two adjacent optical regions, and each of the optical regions is adapted to allow each of the sub-image beams to penetrate. The first light shielding element is located between the display element and the micro lens array, wherein the first light shielding element has a plurality of first light shielding regions and a plurality of first light transmission regions. Each of the first light transmission regions is disposed corresponding to each of the optical regions and is adapted to allow each of the sub-image beams to pass through. Each of the first light-shielding regions is disposed corresponding to each of the first connecting portions and is adapted to prevent each of the sub-image beams from passing through each of the first connecting portions.

In an embodiment of the invention, each of the first light shielding regions is located on a surface of the first light shielding element facing the micro lens array.

In an embodiment of the invention, each of the optical regions has a first surface and a second surface opposite to each other, the first surface faces the display element, and the micro lens array further has a plurality of second connection portions. Each of the first connecting portions is adapted to connect the first surfaces of at least two adjacent ones of the optical regions, and each of the second connecting portions is adapted to connect the second surfaces of at least two adjacent ones of the optical regions.

In an embodiment of the invention, there is a plurality of first pitches between the first connection portions, and there is a plurality of second pitches between the second connection portions. The first pitches are the same as each other, the second pitches are the same as each other, and each of the first pitches and each of the second pitches are different from each other.

In an embodiment of the invention, there is a plurality of first pitches between the first connection portions, there is a plurality of second pitches between the second connection portions, and at least a part of the first pitches are different from each other, or at least a part of the second pitches are different from each other.

In an embodiment of the invention, each of the first light shielding regions is disposed corresponding to each of the first connection portions and each of the second connection portions and is adapted to prevent each adjacent sub-image beams from passing through each of the first connection portions and each of the second connection portions.

In an embodiment of the invention, the first light shielding element further includes a plurality of second light shielding regions, and each of the second light shielding regions is located on a surface of the first light shielding element facing the micro lens array and is disposed corresponding to each of the second connecting portions to be adapted to prevent each of the sub-image beams from passing through each of the second connecting portions.

In an embodiment of the invention, there is a third pitch between the adjacent first light shielding regions, a second light shielding region is located between two of the first light shielding regions and is apart from the more adjacent one of the first light shielding regions by a fourth pitch, and the fourth pitch is smaller than one third of the third pitch.

In an embodiment of the invention, each of the first light shielding regions has a first lateral displacement with respect to the corresponding first connection portion in a direction far away from a main optical axis, a size of the first lateral displacement is smaller than one third of the first pitch between the corresponding first connection portion and the adjacent first connection portion, each of the second light shielding regions has a second lateral displacement with respect to the corresponding second connection portion in a direction close to the main optical axis, and a size of the second lateral displacement is smaller than one third of the second pitch between the corresponding second connection portion and the adjacent second connection portion, wherein a direction of the main optical axis is an extending direction of a central line of a view angle of the display apparatus.

In an embodiment of the invention, each of the first light-shielding regions has a first width, and the first width is smaller than one third of the first pitch between the corresponding first connection portion and the adjacent first connection portion. Each of the second light-shielding regions has a second width, and the second width is smaller than one third of the second pitch between the corresponding second connection portion and the adjacent second connection portion.

In an embodiment of the invention, the first light shielding element includes a light-transmissive first substrate and a light-absorbing material, the light-absorbing material is disposed corresponding to the first light shielding regions and the second light shielding regions to form a plurality of first light shielding portions in the first light shielding regions and form a plurality of second light shielding portions in the second light shielding regions, and regions of the first substrate on which the light-absorbing material does not cover form a plurality of first light transmission portions in the first light transmission regions.

In an embodiment of the invention, the first light shielding element includes an opaque first substrate, and the first substrate has a plurality of through holes. The through holes are disposed corresponding to the first light shielding regions to form a plurality of first light transmission portions in the first light shielding regions. A body of the first substrate forms a plurality of first light shielding portions in the first light shielding region and a plurality of second light shielding portions in the second light shielding regions.

In an embodiment of the invention, the display apparatus further includes a second light shielding element. The second light shielding element is located between the micro lens array and at least one eye of the user, wherein the second light shielding element includes a plurality of second light shielding regions and a plurality of second light transmission regions. Each of the second light transmission regions is disposed corresponding to each of the optical regions and is adapted to allow each of the sub-image beams to pass through. Each of the second light shielding regions is adapted to prevent each of the sub-image beams passing through each of the second connection portions from being transmitted to the at least one eye of the user.

In an embodiment of the invention, each of the second light shielding regions is located on a surface of the second light shielding element facing the micro lens array.

In an embodiment of the invention, each of the first connection portions corresponds to each of the second connection portions, each of the first light shielding regions corresponds to each of the second light shielding regions, each of the second light shielding regions has a third lateral displacement with respect to the corresponding first connection portion in a direction far away from a main optical axis, and a size of the third lateral displacement is smaller than one third of the first pitch between the corresponding first connection portion and the adjacent first connection portion, wherein a direction of the main optical axis is an extending direction of a central line of a view angle of the display apparatus.

In an embodiment of the invention, at least a part of each of the second light shielding regions overlaps with the corresponding first light shielding region.

In an embodiment of the invention, each of the first light-shielding regions has a first width, and the first width is smaller than one third of the first pitch between the corresponding first connection portion and the adjacent first connection portion. Each of the second light-shielding regions has a second width, and the second width is smaller than one third of the second pitch between the corresponding second connection portion and the adjacent second connection portion.

In an embodiment of the invention, the second light shielding element includes a light-transmissive second substrate and a light-absorbing material. The light-absorbing material is disposed corresponding to the second light shielding regions to form a plurality of second light shielding portions in the second light shielding regions, and regions of the second substrate on which the light-absorbing material does not cover form a plurality of second light transmission portions in the second light transmission regions.

In an embodiment of the invention, the second light shielding element includes an opaque second substrate, and the second substrate has a plurality of through holes. The through holes are disposed corresponding to second light shielding regions to form a plurality of second light transmission portions in the second light shielding regions, and a body of the second substrate forms a plurality of second light shielding portions in the second light shielding regions.

In an embodiment of the invention, wherein each of the first light-shielding regions has a first width, and the first width is smaller than one third of the first pitch between the corresponding first connection portion and the adjacent first connection portion.

In an embodiment of the invention, each of the first light shielding regions has a first lateral displacement with respect to the corresponding first connection portion in a direction far away from a main optical axis, and a size of the first lateral displacement is smaller than one third of the first pitch between the corresponding first connection portion and the adjacent first connection portion, wherein a direction of the main optical axis is an extending direction of a central line of a view angle of the display apparatus.

In an embodiment of the invention, the first light shielding element includes a light-transmissive first substrate and a light-absorbing material, the light-absorbing material is disposed corresponding to the second light shielding regions to form a plurality of first light shielding portions in the first light shielding regions, and regions of the first substrate on which the light-absorbing material does not cover form a plurality of first light transmission portions in the first light transmission regions.

In an embodiment of the invention, the first light shielding element includes an opaque first substrate, and the first substrate has a plurality of through holes. The through holes are disposed corresponding to the first light shielding regions to form a plurality of first light transmission portions in the first light shielding regions. A body of the first substrate forms a plurality of first light shielding portions in the first light shielding region.

To sum up, the embodiments of the invention can achieve at least one of the following advantages or effects. In the embodiments of the invention, in the display apparatus, each of the first light shielding regions can be disposed on an optical path of each of the sub-image beams heading for each of the first connection portions. Thereby, each of the sub-image beams traveling toward each of the first connection portions can be blocked by each of the first light shielding regions and be prevented from passing through each of the first connection portions. In this way, each of the sub-image beams can be prevented from being refracted or scattered by optical inactive regions of the first connection portions, such that the occurrence of stray light can be mitigated to improve image quality. Moreover, the display apparatus can also improve the image quality by the additionally disposed second light shielding regions.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
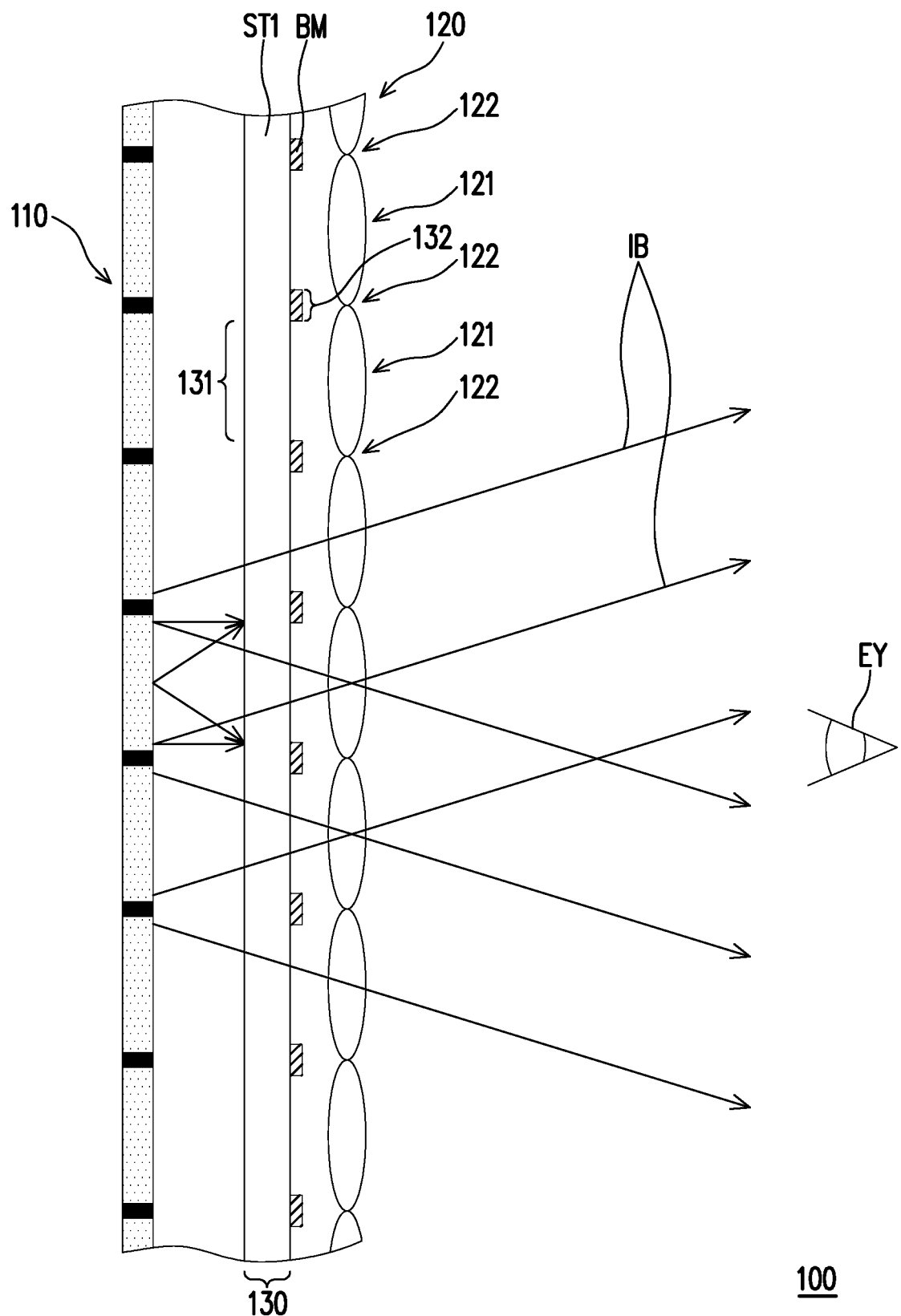
FIG. 1 is a schematic diagram illustrating an optical structure of a display apparatus according to an embodiment of the invention.
Figure 2A:
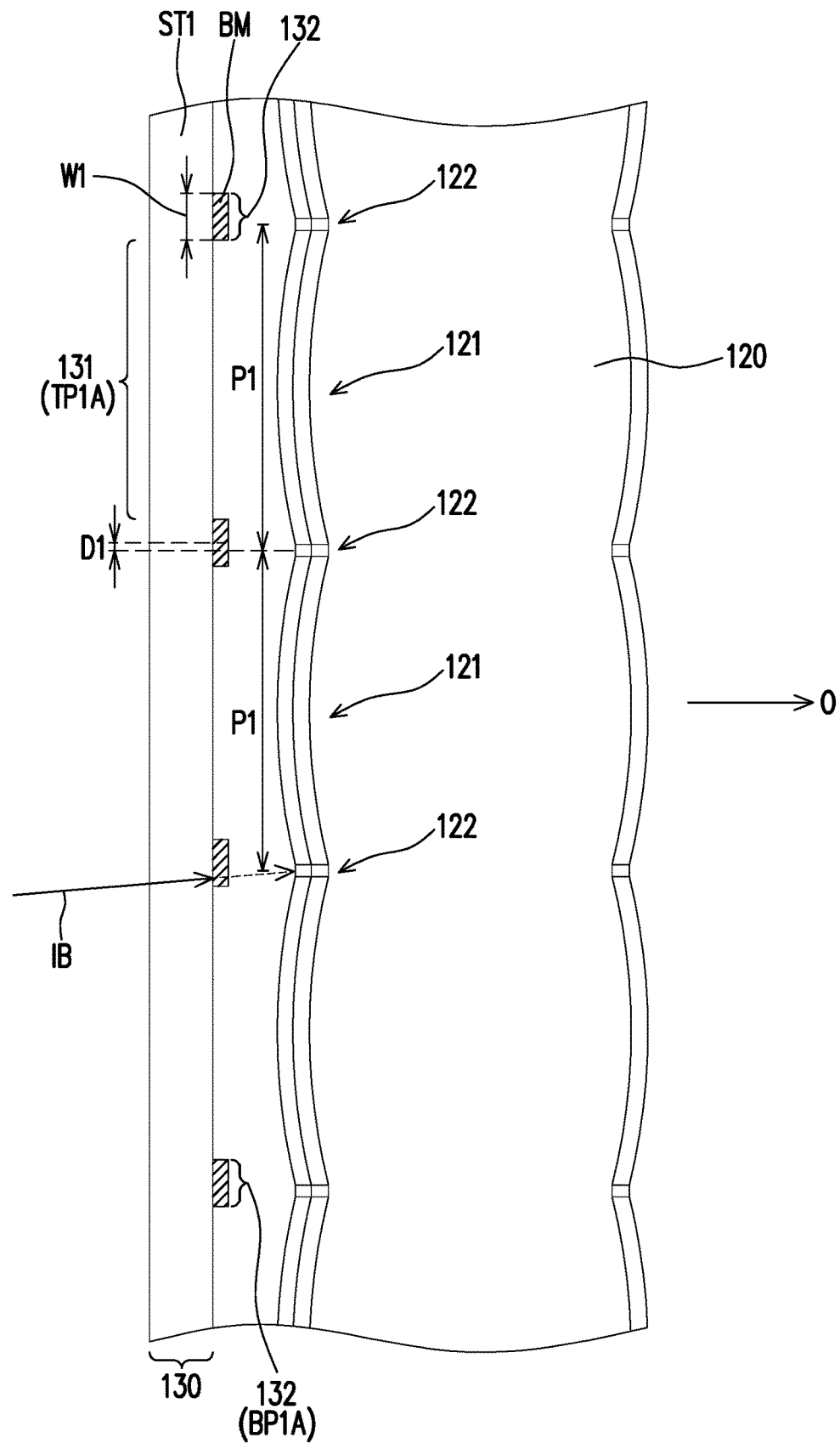
FIG. 2A is a schematic side-view diagram illustrating a first light shielding element depicted in FIG. 1.
Figure 2B:
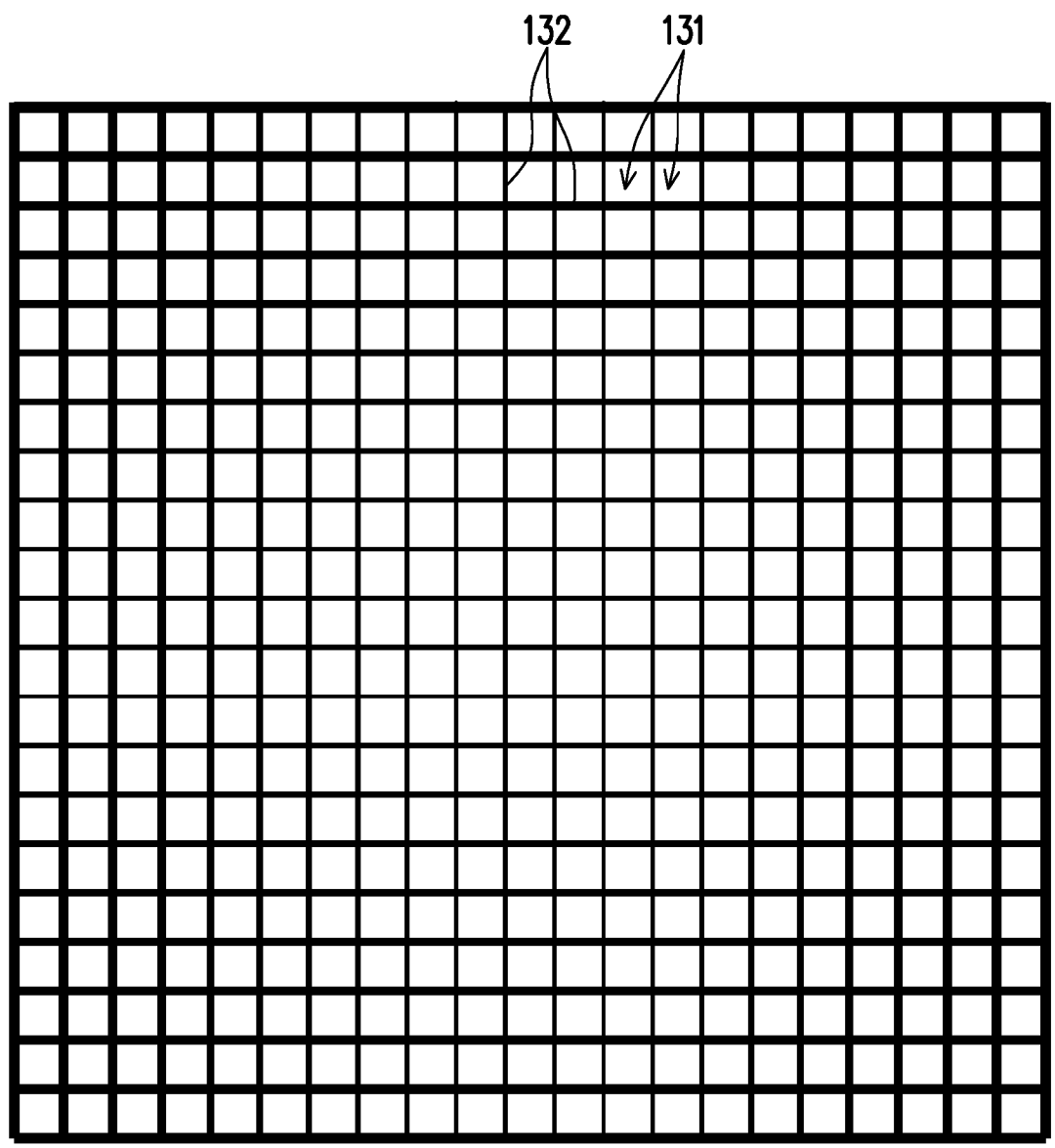
FIG. 2B is a schematic top-view diagram illustrating the first light shielding element depicted in FIG. 1.

FIG. 1 is a schematic diagram illustrating an optical structure of a display apparatus according to an embodiment of the invention. FIG. 2A is a schematic side-view diagram illustrating a first light shielding element depicted in FIG. 1. FIG. 2B is a schematic top-view diagram illustrating the first light shielding element depicted in FIG. 1. The display apparatus is adapted to be disposed in front of at least one eye (EY) of a user and may be a near eye display (NED) apparatus. Referring to FIG. 1, in the present embodiment, a display apparatus 100 includes a display element 110, a micro lens array 120 and a first light shielding element 130. For example, in the present embodiment, the display element 110 is configured to provide a plurality of sub-image beams IB. The display element 110 may be a micro light-emitting diode (micro-LED), a micro organic light-emitting diode (micro-OLED) and a liquid crystal display (LCD) or other display elements and may stack the sub-images through an optical element on a retina of a user to form a disparity image, such that the user may view an in-depth image screen, but the invention is not limited thereto. For example, in the present embodiment, a light-emitting angle of each sub-image beam D3 ranges between +20° and −20°. It should be noted that the value range mentioned herein is used only for exemplificative description and is not intended to limit the invention.

Specifically, referring to FIG. 1 and FIG. 2A, in the present embodiment, the micro lens array 120 is located in a transmission path of the sub-image beams IB, and the first light shielding element 130 is located between the display element 110 and the micro lens array 120. Meanwhile, as illustrated in FIG. 2A, in the present embodiment, the micro lens array 120 has a plurality of optical regions 121 and a plurality of first connection portions 122. Each of the first connecting portions 122 is adapted to connect at least two adjacent optical regions 121. Each of the optical regions 121 is adapted to allow each of the sub-image beams IB to penetrate. Each of the optical regions 121 has a curvature, and each of the first connection portions 122 causes each of the optical regions 121 to generate non-continuous curved surfaces. Furthermore, the micro lens array 120 is formed by, for example, a plurality of lenses, and a forming method thereof includes a checkerboard arrangement, a triangle arrangement or a hexagonal arrangement, but the invention is not limited thereto. In other words, each of the first connecting portions 122 is connected with the adjacent optical regions 121, without the number thereof being limiting, which may be connected with two optical regions 121, three optical regions 121 or four optical regions 121. Referring to FIG. 1 and FIG. 2A, in the present embodiment, the first light shielding element 130 has a plurality of first light shielding regions 132 and a plurality of first light transmission regions 131. Each of the first light transmission regions 131 is disposed corresponding to each of the optical regions 121 and is adapted to allow each of the sub-image beams IB to pass through. Each of the first light-shielding regions 132 is disposed corresponding to each of the first connecting portions 122 and is adapted to prevent each of the sub-image beams IB from passing through each of the first connecting portions 122. More specifically, each of the first light-shielding regions 132 is disposed corresponding to each of the first connecting portions 122 and is adapted to prevent each of the sub-image beams IB from passing through each of the first connecting portions 122. Moreover, as illustrated in FIG. 2A, in the present embodiment, the first light shielding regions 132 are located on a surface of the first light shielding element 130 facing the micro lens array 120. For example, in the present embodiment, a minimum distance between the surface of the first light shielding element 130 facing the micro lens array 120 and the micro lens array 120 is less than 1.5 mm. It should be noted that the value range mentioned herein is used only for exemplificative description and is not intended to limit the invention.

Moreover, as illustrated in FIG. 2B, since the micro lens array 120 has an array arrangement, the first light shielding regions 132 formed corresponding to the first connection portions 122 of the micro lens array 120 form a mesh shape. For example, the first light shielding regions 132 are arranged in a manner of being gradually thickened outward from a central area of the first light shielding element 130, so as to effectively block each adjacent sub-image beams IB coming from the display element 110 and prevent them from passing through each of the first connection portions 122.

Moreover, in the present embodiment, the first light shielding regions 132 may be formed by a light-absorbing material BM.

Specifically, as illustrated in FIG. 2A, in the present embodiment, the first light shielding element 130 includes a light-transmissive first substrate ST1 and a light-absorbing material BM. The light-absorbing material BM is disposed corresponding to the first light shielding regions 132 to form a plurality of first light shielding portions BP1A in the first light shielding regions 132, and regions of the first substrate ST1 on which the light-absorbing material BM does not cover form a plurality of first light transmission portions TP1A in the first light transmission regions. For example, a manufacturing process of the first light shielding portions BP1A may adopt a screen printing, an ink jetting or a photolithography process, and a thickness of the first substrate ST1 ranges between 0.5 mm and 1.2 mm.

Furthermore, as illustrated in FIG. 2A and FIG. 2B, in the present embodiment, each of the first light-shielding regions 132 has a first width W1, and the first width W1 is smaller than one third of a first pitch P1 between the corresponding first connection portion 122 and the adjacent first connection portion 122. Moreover, as illustrated in FIG. 2A, each of the first light shielding regions 132 has a first lateral displacement D1 with respect to the corresponding first connection portion 122 in a direction far away from a main optical axis O, and a size of the first lateral displacement D1 is smaller than one third of the first pitch P1 between the corresponding first connection portion 122 and the adjacent first connection portion 122, wherein a direction of the main optical axis O is an extending direction of a main center beam of the sub-image beams IB projected by the display apparatus 100.

In this way, with the first light shielding portions BP1A formed by the light-absorbing material BM, the first light shielding portions 132 may be formed. Meanwhile, each of the first light shielding regions 132 may be disposed on an optical path of each of the sub-image beams IB heading for each of the first connection portions 122. In this way, each of the sub-image beams IB traveling toward each of the first connection portions 122 may be blocked by each of the first light shielding regions 132 and be prevented from passing through each of the first connection portions 122. In this way, each of the sub-image beams IB may be prevented from being refracted or scattered by optical inactive regions of the first connection portions 122, so as to mitigate occurrence of stray light and improve image quality.

Even though the first light shielding regions BP1A in the first light shielding regions 132 are described as being formed by the light-absorbing material BM as an example in the aforementioned embodiments, the invention is not limited thereto. In other embodiments, the first light shielding portions BP1A may also be formed in other manners, which will be further described with reference to FIG. 3 below.

Figure 3:
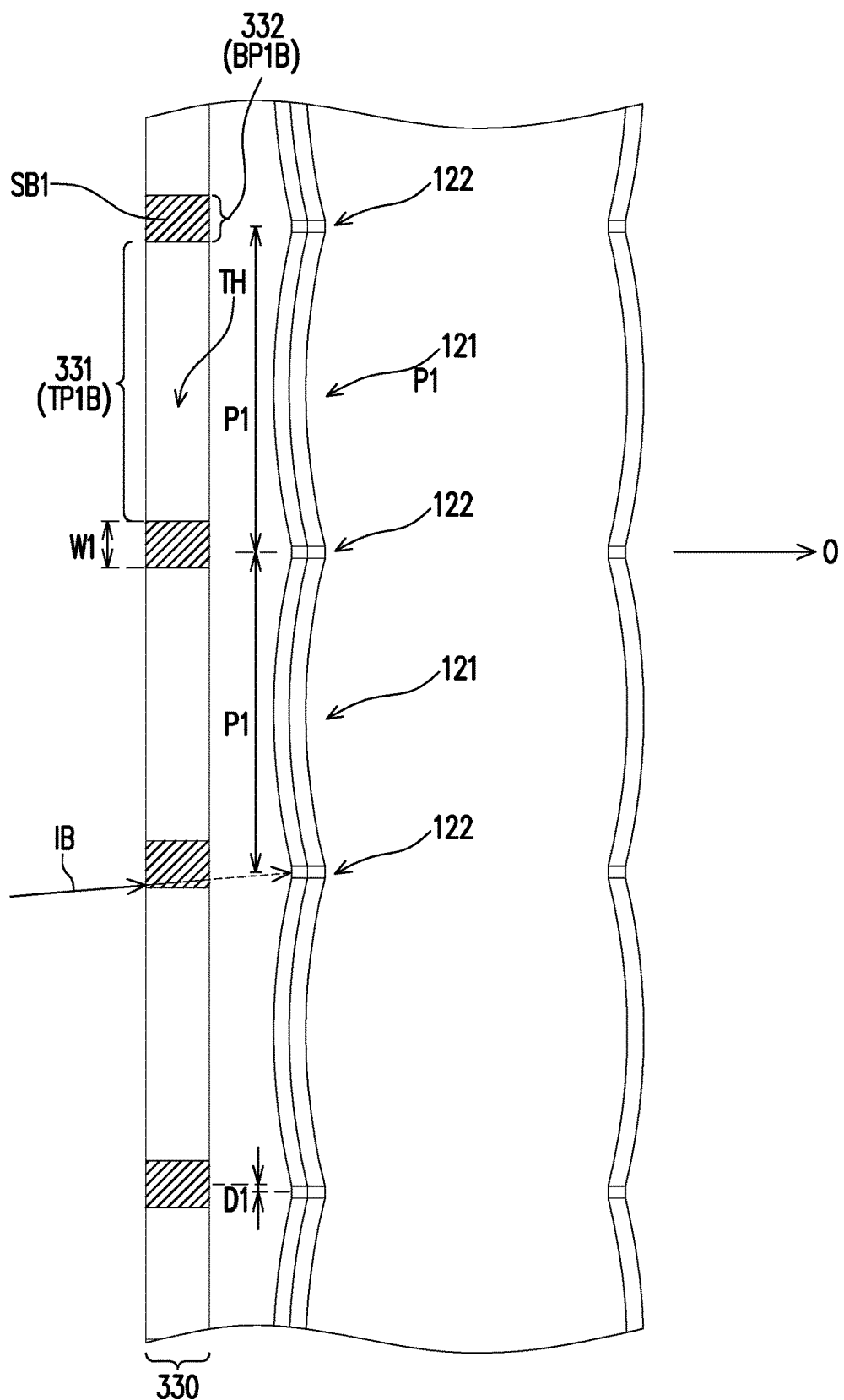
FIG. 3 is a schematic side-view diagram illustrating another first light shielding element depicted in FIG. 1.

FIG. 3 is a schematic side-view diagram illustrating another first light shielding element depicted in FIG. 1. Referring to FIG. 3, in the present embodiment, a first light shielding element 330 and the first light shielding element 130 illustrated in FIG. 2A are similar, and the difference therebetween will be described below. Referring to FIG. 3, in the present embodiment, the first light shielding element 330 includes an opaque first substrate SB1 having a plurality of through holes TH. These through holes TH are disposed corresponding to first light transmission regions 331 of the first light shielding element 130 to form a plurality of first light transmission regions TP1B in the first light transmission regions 331, and a body of the first substrate SB1 forms a plurality of first light shielding portions BP1B in first light shielding regions 332. In other words, in the present embodiment, the body of the opaque first substrate SB1 forms the first light shielding portions PB1B. For example, a manufacturing process of the first light shielding portions BP1B may adopt a photolithography and etching process or a machining process, and a thickness of the first substrate SB1 may be smaller than 1 mm.

In this way, with the first light shielding portions BP1B formed by the body of the opaque first substrate SB1, the first light shielding regions 332 may also be formed. In addition, when the first light shielding element 330 is applied to the display apparatus 100 illustrated in FIG. 1, each of the first light shielding regions 332 also can be disposed on the optical path of each of the sub-image beams IB heading for each of the first connection portions 122. Thereby, each of the sub-image beams D3 (as shown by a dashed line) traveling toward each of the first connection portions 122 is blocked by each of the first light shielding regions 332 and be prevented from passing through each of the first connection portions 122. In this way, each of the sub-image beams IB may be prevented from being refracted or scattered by the optical inactive regions of the first connection portions 122 to mitigate the occurrence of stray light, such that the display apparatus 100 may achieve the functions and effects mentioned above. Other related details will not be repeatedly described hereinafter.

Figure 4:
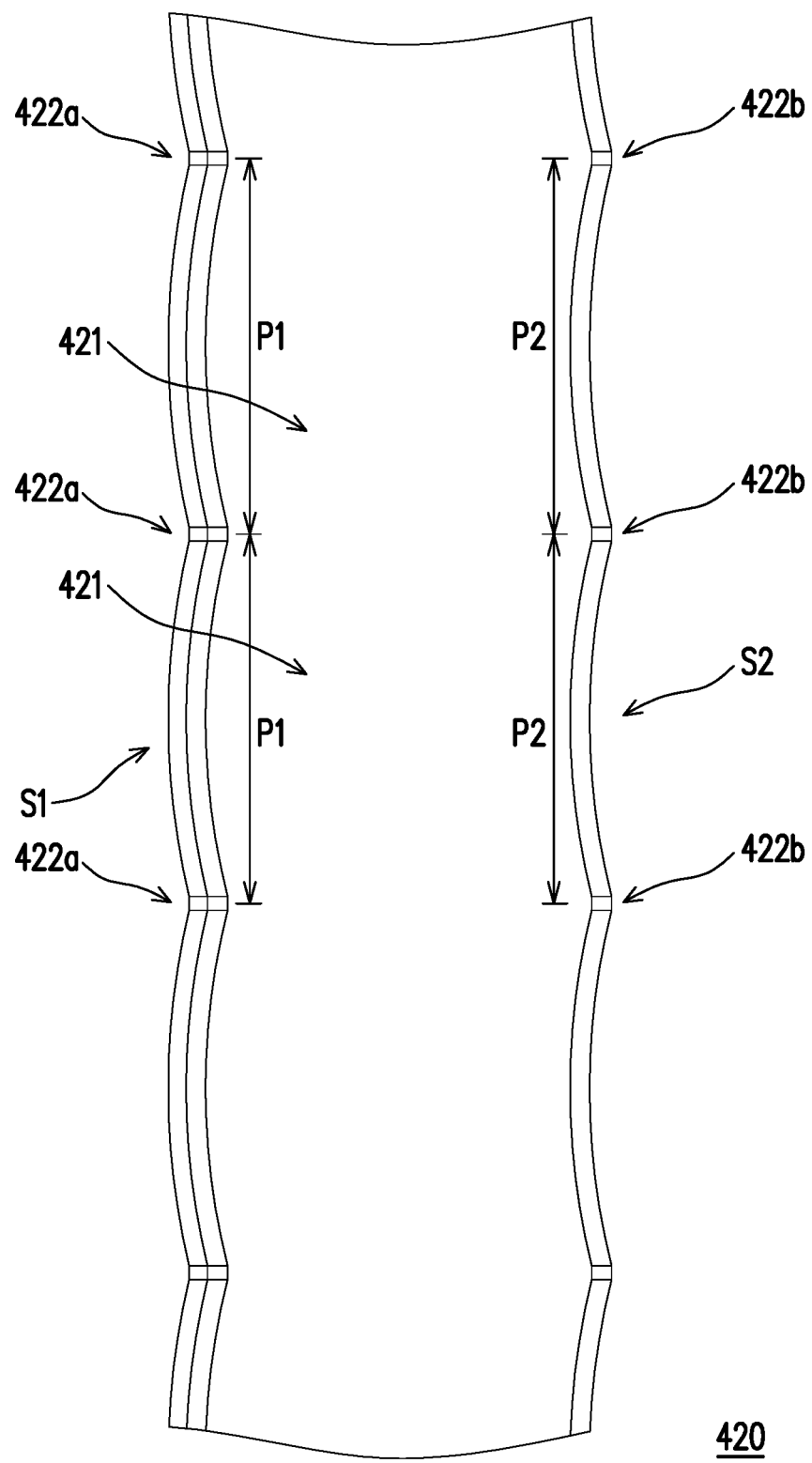
FIG. 4 is a schematic side-view diagram illustrating another micro lens array depicted in FIG. 1.
Figure 5A:
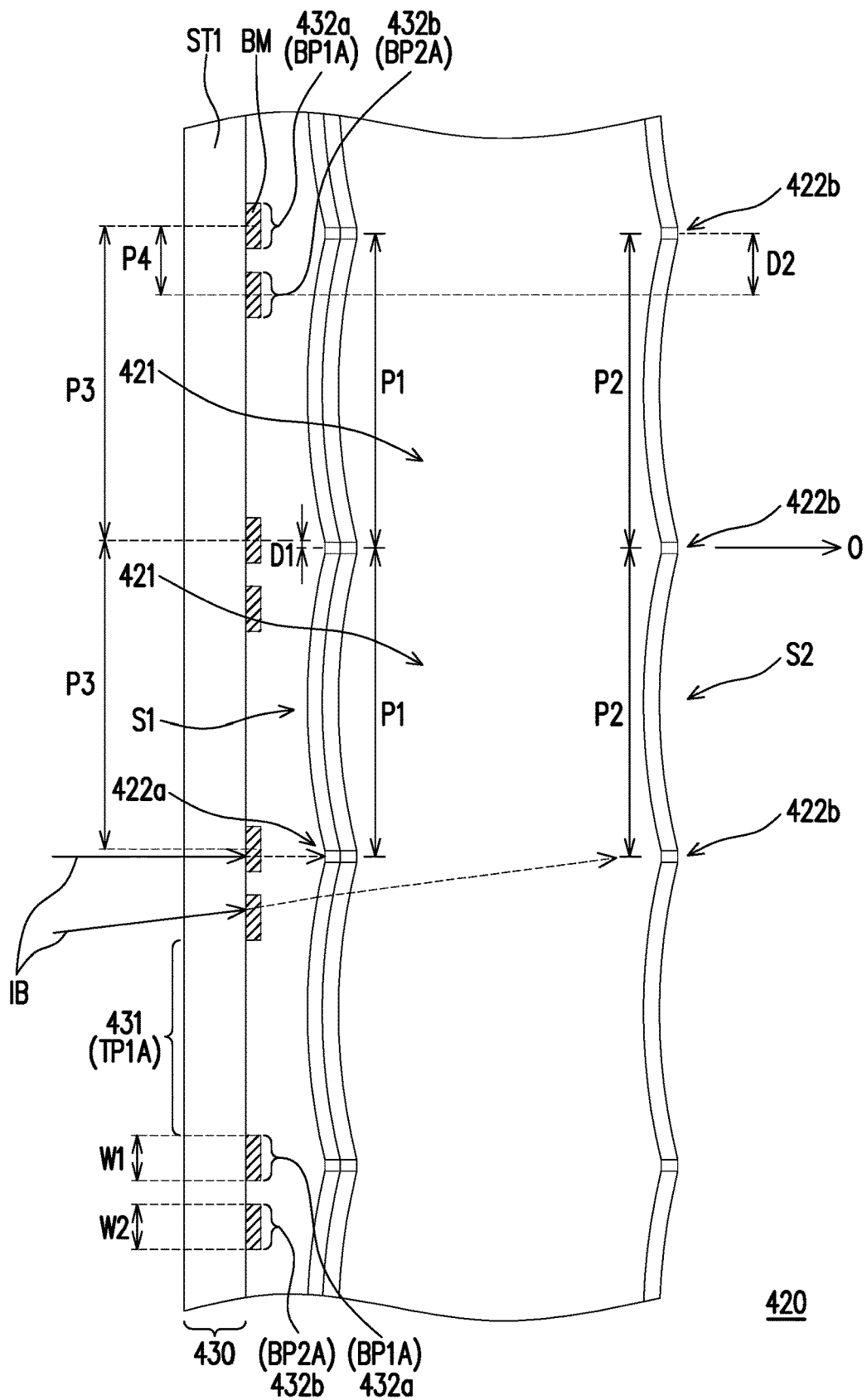
FIG. 5A is a schematic side-view diagram illustrating another first light shielding element depicted in FIG. 1.
Figure 5B:
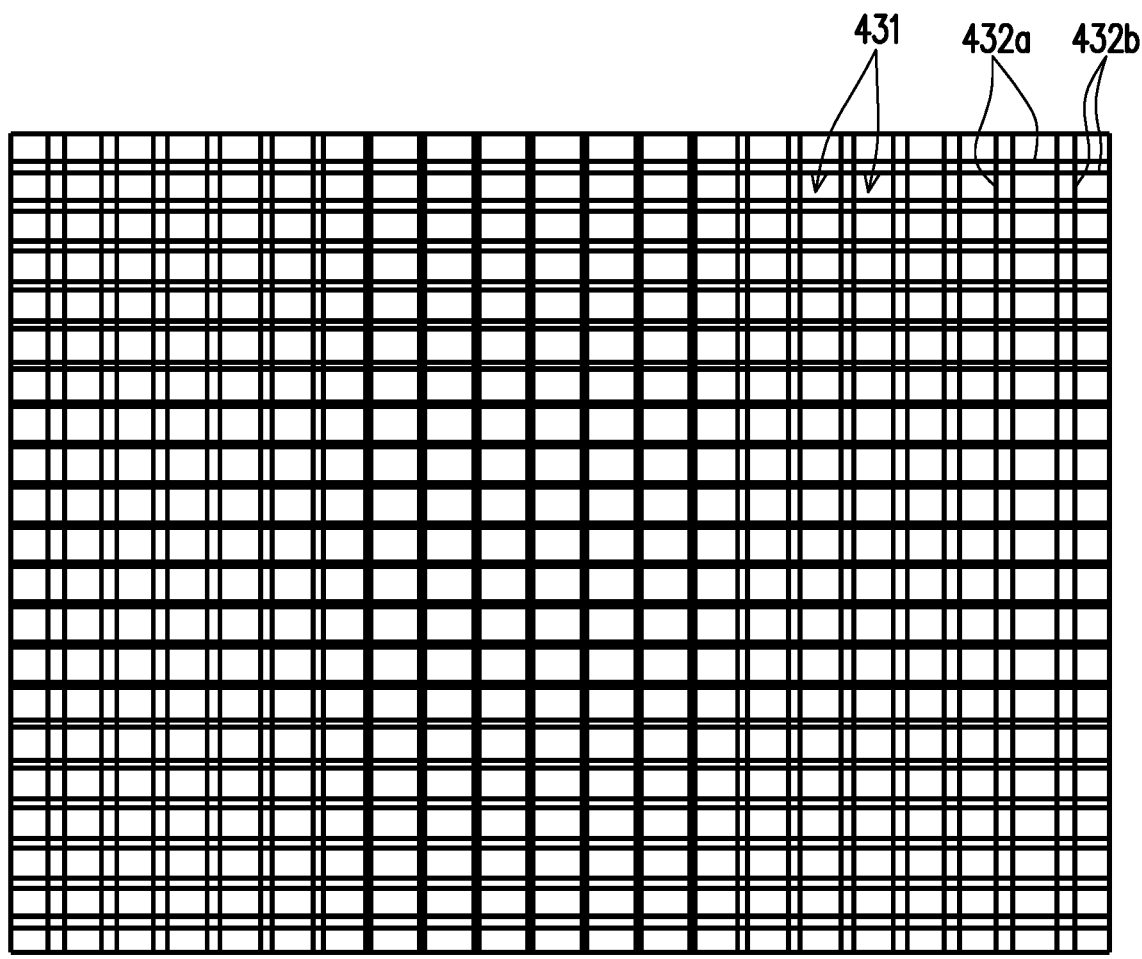
FIG. 5B is a schematic top-view diagram illustrating another first light shielding element depicted in FIG. 1.
Figure 5C:
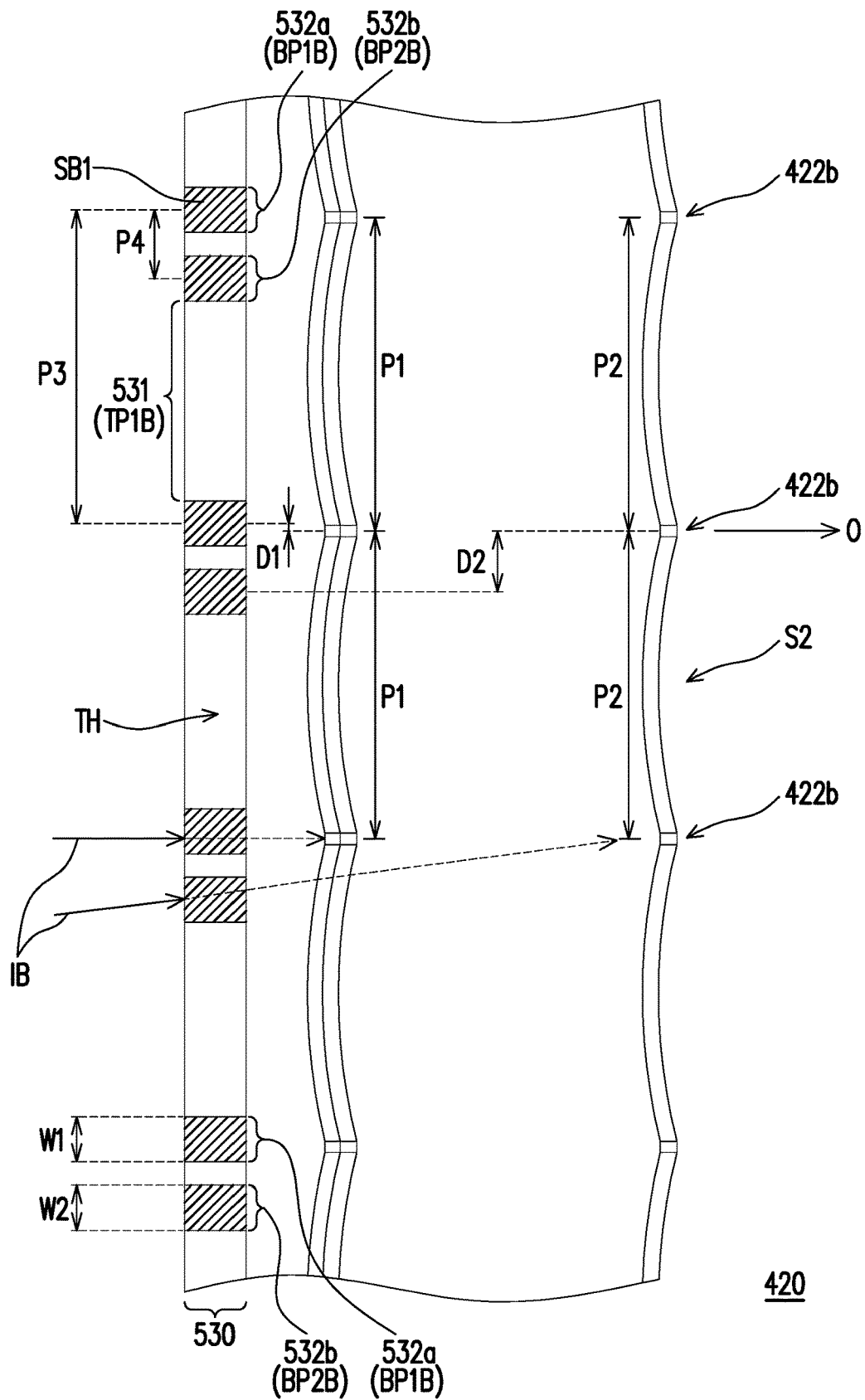
FIG. 5C is a schematic side-view diagram illustrating another first light shielding element depicted in FIG. 1.

FIG. 4 is a schematic side-view diagram illustrating another micro lens array depicted in FIG. 1. FIG. 5A is a schematic side-view diagram illustrating another first light shielding element depicted in FIG. 1. FIG. 5B is a schematic top-view diagram illustrating another first light shielding element depicted in FIG. 1. FIG. 5C is a schematic side-view diagram illustrating another first light shielding element depicted in FIG. 1. Referring to FIG. 4 through FIG. 5C, a micro lens array 420 of the embodiment illustrated in FIG. 4 is similar to the micro lens array 120 illustrated in FIG. 1, a first light shielding element 430 of the embodiment illustrated in FIG. 5A is similar to the first light shielding element 130 illustrated in FIG. 2A, and a first light shielding element 530 of the embodiment illustrated in FIG. 5C is similar to the first light shielding element 330 illustrated in FIG. 2A. The difference among them will be described below.

Referring to FIG. 4, in the present embodiment, each optical region 421 has a first surface S1 and a second surface S2 opposite to each other, the first surface S1 faces the display element 110, and the micro lens array 420 further has a plurality of second connection portions 422b. Each of the first connecting portions 422a is adapted to connect the first surfaces S1 of at least two adjacent optical regions 421, and each of the second connecting portions 422b is adapted to connect the second surfaces S2 of at least two adjacent optical regions 421. For example, in the present embodiment, there is a plurality of first pitches P1 between the first connection portions 422a, and there is a plurality of second pitches P2 between the second connection portions 422b. The first pitches P1 are the same as each other, the second pitches P2 are the same as each other, and each of the first pitches P1 and each of the second pitches P2 are different, but the invention is not limited thereto. In other embodiments, at least a part of the first pitches P1 between the first connection portions 422a may be different from each other. Meanwhile, at least a part of the second pitches P2 between the second connection portions 422b may be different from each other.

Furthermore, in the present embodiment, since each of the optical regions 421 of the micro lens array 420 has both the first connection portion 422 and the second connection portion 422b respectively on the first surface S1 and the second surface S2, several displacements may be disposed between the first connection portions 422a and second connection portions 422b which are opposite to each other since the pitches are different from each other.

Accordingly, as illustrated in FIG. 5A and FIG. 5B, in the present embodiment, second light shielding regions 432b may be additionally disposed on the first light shielding element 430. For example, as illustrated in FIG. 5A and FIG. 5B, in the present embodiment, the first light shielding element 430 further includes the second light shielding regions 432b. Each of the second light shielding regions 432b is located on a surface of the first light shielding element 430 facing the micro lens array 420 and is disposed corresponding to each of the second connecting portions 422b to be adapted to prevent each of the sub-image beams IB from passing through each of the second connecting portions 422b. Details related to the disposition of the second light shielding regions 432b will be further described below.

Furthermore, as illustrated in FIG. 5A, in the present embodiment, there is a third pitch P3 between each two adjacent first light shielding regions 432a, wherein one of the second light shielding region 432b is located between two of the first light shielding regions 432a and is apart from the more adjacent first light shielding regions 432a by has a fourth pitch P4, and the fourth pitch P4 is smaller than one third of the third pitch P3.

In addition, as illustrated in FIG. 5A, in the present embodiment, each of the first light shielding regions 432a has a first lateral displacement D1 with respect to the corresponding first connection portion 422a in a direction far away from the main optical axis O, and a size of the first lateral displacement D1 is smaller than one third of the first pitch P1 between the corresponding first connection portion 422a and the adjacent first connection portion 422a. Each of the second light shielding regions 432b has a second lateral displacement D2 with respect to the corresponding second connection portion 422b in a direction close to the main optical axis O, and a size of the second lateral displacement D2 is smaller than one third of the second pitch P2 between the corresponding second connection portion 422b and the adjacent second connection portion 422b.

Moreover, as illustrated in FIG. 5A, in the present embodiment, each of the first light-shielding regions 432a has a first width W1, and the first width W1 is smaller than one third of the first pitch P1 between the corresponding first connection portion 422a and the adjacent first connection portion 422a. Each of the second light-shielding regions 432b has a second width W2, and the second width W2 is smaller than one third of the second pitch P2 between the corresponding second connection portion 422b and the adjacent second connection portion 422b.

In this way, referring to FIG. 4 and FIG. 5B, in the present embodiment, the sub-image beams IB originally passing through the optical regions 421 may also probably pass through optical inactive regions of the second connection portions 422b located on the second surfaces S2, thereby being blocked by the second light shielding regions 432b and being prevented from being refracted or scattered due to passing through each of the second connection portions 422b. Thus, the occurrence of stray light may also be mitigated to improve image quality.

On the other hand, as illustrated in FIG. 5A, in the present embodiment, the first light shielding regions 432 may also be formed by the light-absorbing material BM by a method similar to the manufacturing method adopted by the embodiment illustrated in FIG. 2A. Specifically, as illustrated in FIG. 5A and FIG. 5B, the light-absorbing material BM is disposed corresponding to the first light shielding regions 432a and the second light shielding regions 432b to respectively form a plurality of first light shielding portions BP1A and a plurality of second light shielding portions BP2A. Details related to the manufacturing may be obtained with reference to the description related to the embodiment illustrated in FIG. 2A and will not be repeated hereinafter. It is to be mentioned that referring to FIG. 5B, the first light shielding regions 432a and the second light shielding regions 432b overlap with each other in a central area of the first light shielding element 430, however, gaps appear between the first light shielding regions 432a and the second light shielding regions 432b due to being arranged outwards from the central area. It is to be mentioned that (by referring to the illustration) the gaps between the first light shielding regions 432a and the second light shielding regions 432b are gradually enlarged along a vertical direction or a horizontal direction.

In this way, with the first light shielding portions BP1A and the second light shielding portions BP2A formed by the light-absorbing material BM, the first light shielding regions 432a and the second light shielding regions 432b may be formed. In addition, when the first light shielding element 430 is applied to the display apparatus 100 illustrated in FIG. 1, each of the first light shielding regions 432a and each of the second light shielding regions 432b are disposed on optical paths of each of the sub-image beams IB heading for each of the first connection portions 422a and each of the second connection portions 422b. In this way, each of the sub-image beams IB traveling toward each of the first connection portions 422a and each of the second connection portions 422b is blocked by each of the first light shielding regions 432a and each of the second light shielding regions 432b and may be prevented from passing through each of the first connection portions 422a and each of the second connection portions 422b. In this way, each of the sub-image beams IB may be prevented from being refracted or scattered by optical inactive regions of the first connection portions 422a and the second connection portions 422b to mitigate the occurrence of stray light, such that the display apparatus 100 may achieve the functions and effects mentioned above. Other related details will not be repeatedly described hereinafter.

Moreover, referring to FIG. 5C, in the embodiment illustrated in FIG. 5C, the first light shielding portions BP1B and the second light shielding portions BP2B may also be formed by a method similar to the manufacturing method adopted by the embodiment illustrated in FIG. 3, such that a body of the first substrate SB1 of the first light shielding element 530 forms a plurality of first light shielding portions BP1B in first light shielding regions 532a, forms a plurality of second light shielding portions BP2B in second light shielding regions 532b and forms a plurality of first light transmission portions TP1B in first light transmission regions 531 with the through holes TH. Details related to the manufacturing may be obtained with reference to the description related to the embodiment illustrated in FIG. 3 and will not be repeated hereinafter.

In this way, with the first light shielding portions BP1A and the second light shielding portions BP2A formed by the body of the opaque first substrate SB1, the first light shielding regions 532a and the second light shielding regions 432b may also be formed. In addition, when the first light shielding element 530 is applied to the display apparatus 100 illustrated in FIG. 1, each of the first light shielding regions 532a and each of the second light shielding regions 532b are disposed on optical paths of each of the sub-image beams IB heading for each of the first connection portions 422a and each of the second connection portions 422b. In this way, each of the sub-image beams IB traveling toward each of the first connection portions 422a and each of the second connection portions 422b is blocked by each of the first light shielding regions 532a and each of the second light shielding regions 532b, and may be prevented from passing through each of the first connection portions 422a and each of the second connection portions 422b. In this way, each of the sub-image beams D3 may be prevented from being refracted or scattered by the optical inactive regions of the first connection portions 422a and the second connection portions 422b to mitigate the occurrence of stray light, such that the display apparatus 100 may achieve the functions and effects mentioned above. Other related details will not be repeatedly described hereinafter.

Figure 5D:
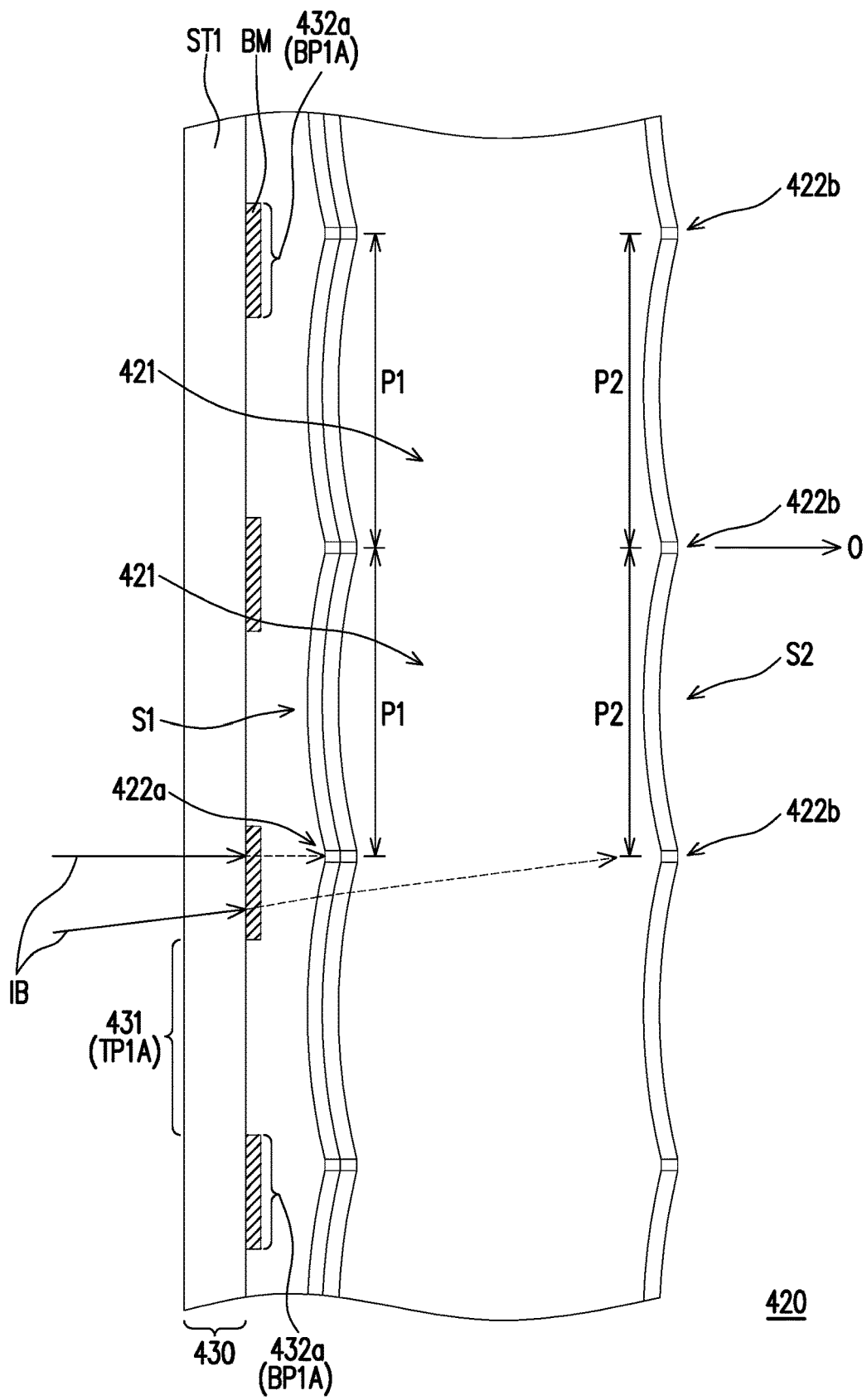
FIG. 5D is a schematic side-view diagram illustrating yet another first light shielding element depicted in FIG. 1.
Figure 5E:
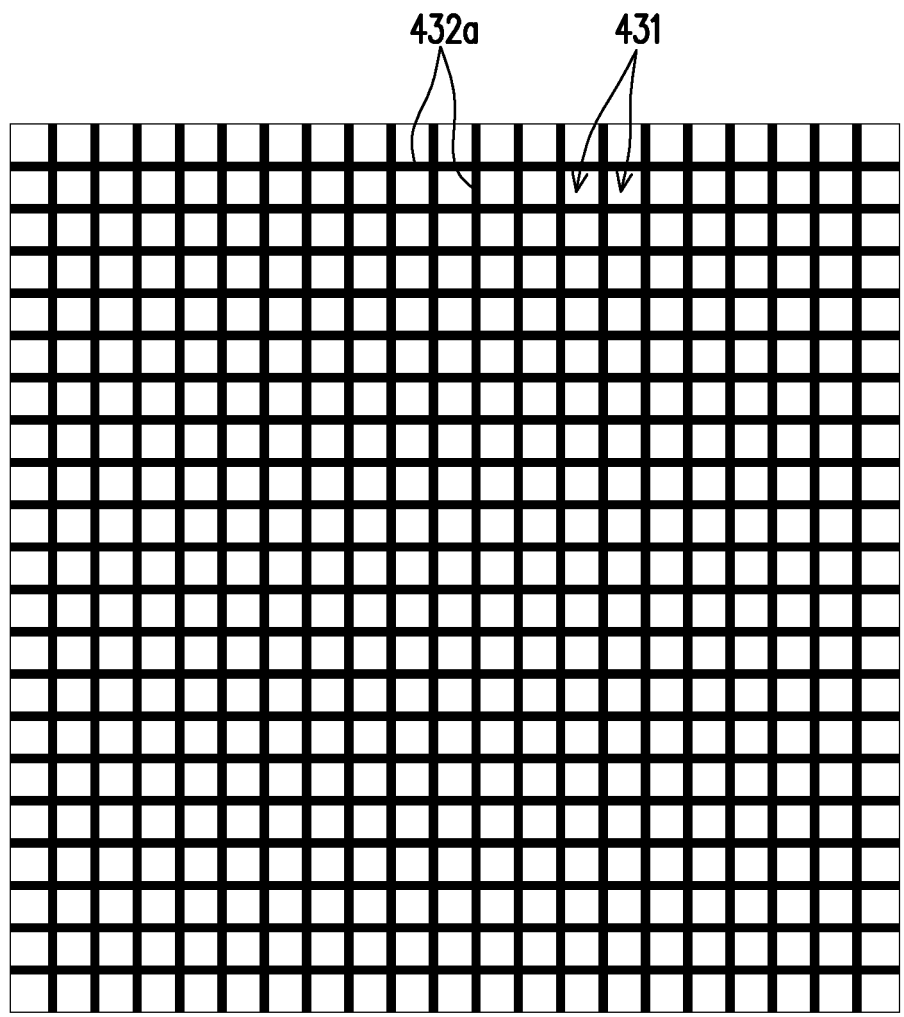
FIG. 5E is a schematic top-view diagram illustrating yet another first light shielding element depicted in FIG. 1.

FIG. 5D is a schematic side-view diagram illustrating yet another first light shielding element depicted in FIG. 1. FIG. 5E is a schematic top-view diagram illustrating yet another first light shielding element depicted in FIG. 1. Referring to FIG. 5A and FIG. 5D, the first light shielding element 430 of the embodiment illustrated in FIG. 5D is similar to the first light shielding element 430 of the embodiment illustrated in FIG. 5A, and the difference therebetween will be described below.

Accordingly, as illustrated in FIG. 5D and FIG. 5E, in the present embodiment, the first light shielding element 430 may include the first light shielding regions 432a adapted to prevent each of the sub-image beams IB from passing through each of the first connection portions 422a and each of the second connection portions 422b.

As illustrated in FIG. 5D, in the present embodiment, each of the first light shielding regions 432a is opposite to the corresponding first connection portion 422a and second connection portion 422b. In this way, in the present embodiment, the sub-image beams IB originally travelling toward the optical inactive regions of the first connection portions 422a and the second connection portions 422b may be blocked by the first light shielding regions 432a from passing through each of the first connection portions 422a and each of the second connection portions 422b. Thus, the occurrence of stray light may be mitigated to improve the image quality.

Moreover, referring to FIG. 5E, FIG. 5E is a schematic top-view diagram illustrating yet another first light shielding element depicted in FIG. 1. Details related to the manufacturing may be obtained with reference to the description related to the embodiment illustrated in FIG. 5 and will not be repeated hereinafter. In this way, each of the sub-image beams IB may be prevented from being refracted or scattered by the optical inactive regions of the first connection portions 422a and the second connection portions 422b to mitigate the occurrence of stray light, such that the display apparatus 100 may achieve the functions and effects mentioned above. Other related details will not be repeatedly described hereinafter.

Even though the second light shielding regions 432b or 532b are described as being additionally disposed on the first light shielding elements 430 or 530 as an example, the invention is not limited thereto. In other embodiments, the second light shielding regions may also be disposed on other shielding elements, which will be further described with reference to FIG. 6 below.

Figure 6:
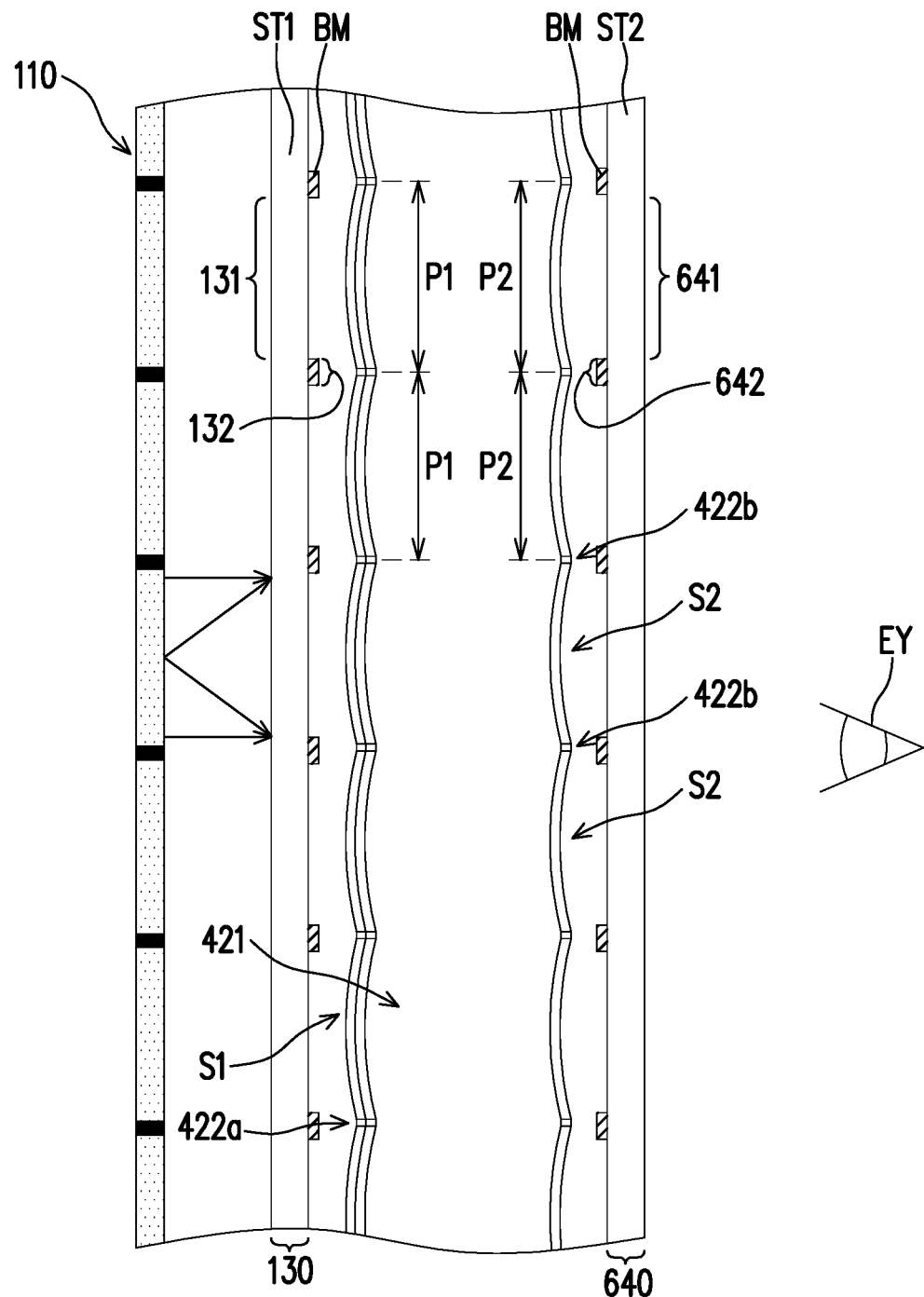
FIG. 6 is a schematic diagram illustrating an optical structure of a display apparatus according to another embodiment of the invention.
Figure 7A:
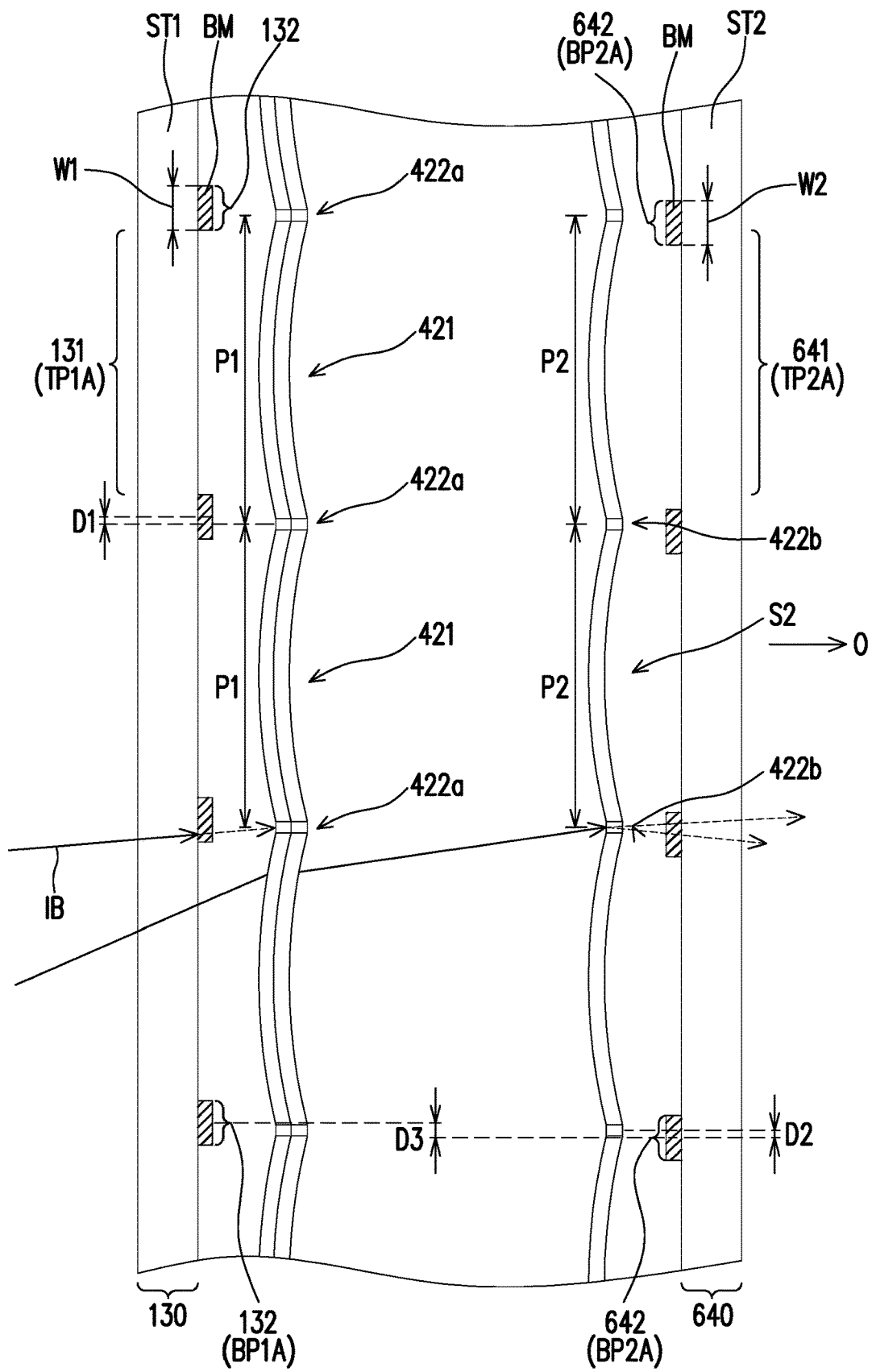
FIG. 7A is a schematic side-view diagram illustrating a first light shielding element and a second light shielding element depicted in FIG. 6.
Figure 7B:
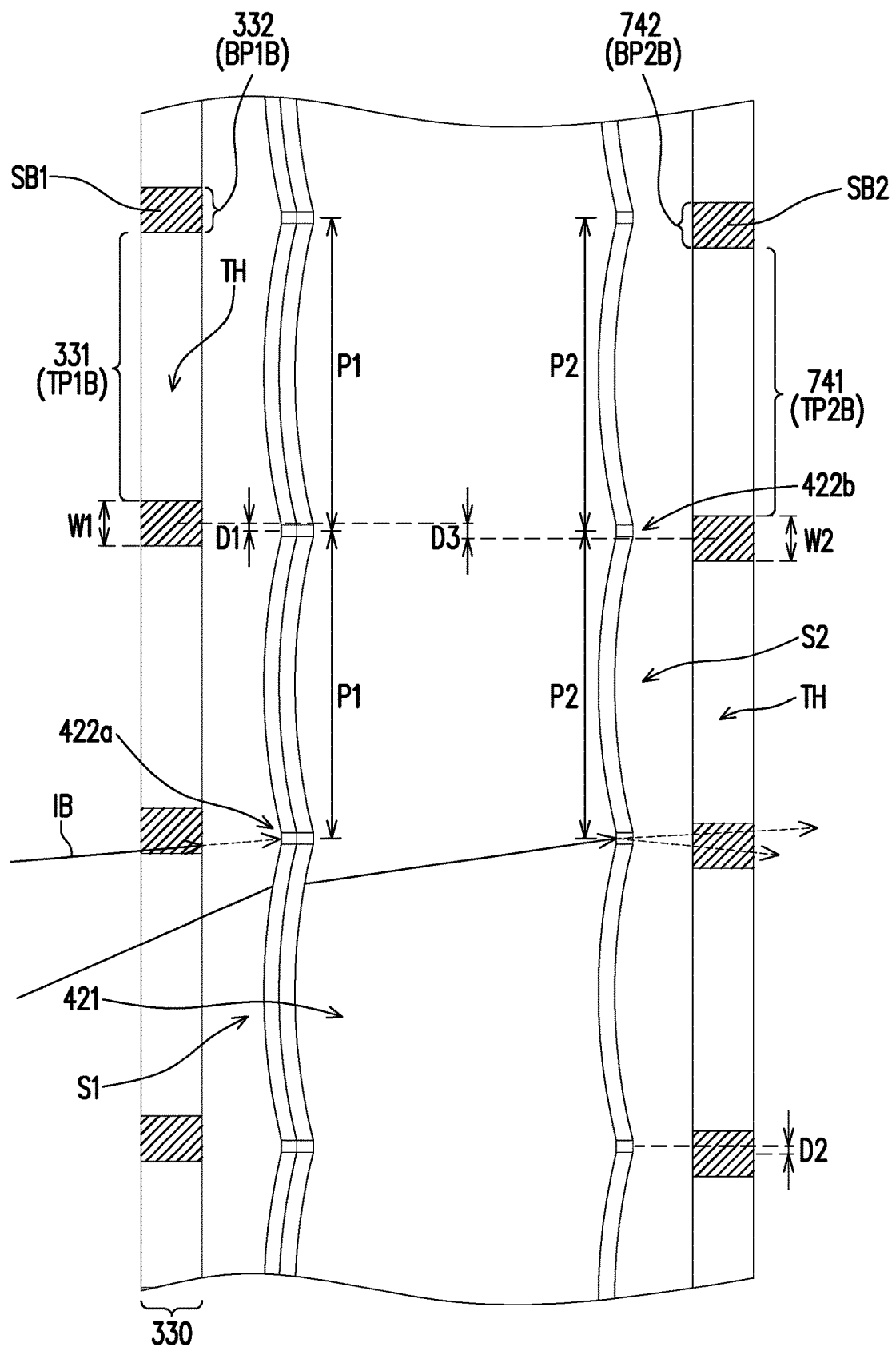
FIG. 7B is a schematic side-view diagram illustrating another first light shielding element and another second light shielding element depicted in FIG. 6.

FIG. 6 is a schematic diagram illustrating an optical structure of a display apparatus according to another embodiment of the invention. FIG. 7A is a schematic side-view diagram illustrating a first light shielding element and a second light shielding element depicted in FIG. 6. FIG. 7B is a schematic side-view diagram illustrating another first light shielding element and another second light shielding element depicted in FIG. 6. Referring to FIG. 6 through FIG. 7B, a display apparatus 600 illustrated in FIG. 6 is similar to the display apparatus 100 illustrated in FIG. 1, a first light shielding element 130 and a second light shielding element 640 illustrated in FIG. 7A are similar to the first light shielding element 130 illustrated in FIG. 2A, a first light shielding element 330 and a second light shielding element 740 illustrated in FIG. 7B are similar to the first light shielding element 330 illustrated in FIG. 3, and the difference among them will be described below.

Referring to FIG. 6, in the present embodiment, the display apparatus 600 may further include a second light shielding element 640. Specifically, Referring to FIG. 6 and FIG. 7A, in the present embodiment, the second light shielding element 640 is located between the micro lens array 420 and the at least one eye EY of the user. Referring to FIG. 6 and FIG. 7A, in the present embodiment, the second light shielding element 640 includes a plurality of second light shielding regions 642 and a plurality of second light transmission regions 641. Each of the second light transmission regions 641 is disposed corresponding to each optical region 421 and is adapted to allow each of the sub-image beams IB to pass through. Each of the second light shielding regions 642 is adapted to prevent each of the sub-image beams D3 passing through each of the second connection portions 422b from being transmitted to the at least one eye EY of the user.

More specifically, as illustrated in FIG. 7A, in the present embodiment, the second light shielding regions 642 are located on a surface of the second light shielding element 640 facing the micro lens array 420. For example, in the present embodiment, a minimum distance between the surface of the second light shielding element 640 facing the micro lens array 420 and the micro lens array 420 is smaller than 1.5 mm. It should be noted that the value range mentioned herein is used only for exemplificative description and is not intended to limit the invention.

Furthermore, as illustrated in FIG. 7A, in the present embodiment, each of the first light-shielding regions 132 has a first width W1, and the first width W1 is smaller than one third of the first pitch P1 between the corresponding first connection portion 422a and the adjacent first connection portion 422a. Each of the second light-shielding regions 642 has a second width W2, and the second width W2 is smaller than one third of the second pitch P2 between the corresponding second connection portion 422b and the adjacent second connection portion 422b.

Moreover, as illustrated in FIG. 7A, in the present embodiment, at least a part of each of the second light shielding regions 642 may overlap or not overlap with the corresponding first light shielding region 132, but the invention is not limited thereto. For example, as illustrated in FIG. 7A, in the present embodiment, each of the first connection portions 422a corresponds to each of the second connection portions 422b, each of the first light shielding regions 132 corresponds to each of the second light shielding regions 642, each of the second light shielding regions 642 has a third lateral displacement D3 with respect to the corresponding first connection portion 132 in the direction far away from the main optical axis O, and a size of the third lateral displacement D3 is smaller than one third of the first pitch P1 between the corresponding first connection portion 422a and the adjacent first connection portion 422a.

In this way, referring to FIG. 6 and FIG. 7A, in the present embodiment, the sub-image beams IB passing through the optical inactive regions of the second connection portions 422b located on the second surfaces S2 of the optical regions 421 may be blocked by the second light shielding regions 642 disposed on the second light shielding element 640 and prevented from being transmitted to the at least one eye EY of the user, thereby preventing the user from viewing the stray light to improve the image quality.

On the other hand, as illustrated in FIG. 7A, in the present embodiment, the second light shielding regions 642 may also be formed by a method similar to the manufacturing method adopted by the embodiment illustrated in FIG. 2A and by the light-absorbing material BM disposed on the second light shielding element 640. Specifically, as illustrated in FIG. 7A, the second light shielding element 640 includes a light-transmissive second substrate ST2 and the light-absorbing material BM. The light-absorbing material BM is disposed corresponding to the second light shielding regions 642 to form a plurality of second light shielding portions BP2A in the second light shielding regions 642, and regions of the second substrate ST2 on which the light-absorbing material BM does not cover form a plurality of second light transmission portions TP2A in the second light transmission regions 641. Details related to the manufacturing may be obtained with reference to the description related to the embodiment illustrated in FIG. 2A and will not be repeated hereinafter.

In this way, with the second light shielding portions BP2A formed by the light-absorbing material BM, the second light shielding portions 642 may be formed. In addition, referring to FIG. 6 and FIG. 7A, each of the first light shielding regions 132 of the first light shielding element 130 may be disposed on the optical path of each of the sub-image beams IB heading for each of the first connection portions 422a, and each of the second light shielding regions 642 of the second light shielding element 640 may be disposed on an optical path of each of the sub-image beams IB passing through the optical inactive regions of the second connection portions 422b located on the second surfaces S2 of the optical regions 421. In this way, each of the sub-image beams IB traveling toward each of the first connection portions 422a is blocked by each of the first light shielding regions 132 and prevented from passing through each of the first connection portions 422a, and each of the sub-image beams IB passing through the optical inactive region of each of the second connection portions 422b traveling toward the at least one eye EY of the user is blocked by each of the second light shielding regions 642 and prevented from being transmitted to the at least one eye EY of the user. Thus, the user may be prevented from viewing the stray light to improve the image quality, such that the display apparatus 600 may achieve the functions and effects mentioned above. Other related details will not be repeatedly described hereinafter.

Moreover, as illustrated in FIG. 7B, in the embodiment illustrated in FIG. 7B, the second light shielding portions BP2B may also be formed by a method similar to the manufacturing method of the first light shielding element 330 adopted by the embodiment illustrated in FIG. 3 by the light-absorbing material BM disposed on the second light shielding element 740. Specifically, as illustrated in FIG. 7B, the second light shielding element 740 includes an opaque second substrate SB2 having a plurality of through holes TH. The through holes TH are disposed corresponding to the second light transmission regions 741 to form a plurality of second light transmission regions TP2B in the second light shielding regions 741, and a body of the second substrate SB2 forms a plurality of second light shielding portions BP2B in the second light shielding regions 742. Details related to the manufacturing may be obtained with reference to the description related to the embodiment illustrated in FIG. 3 and will not be repeated hereinafter.

In this way, with the second light shielding portions PB2B formed by the body of the opaque second substrate SB2, the second light shielding regions 742 may be formed. In addition, when the first light shielding element 330 and the second light shielding element 740 are applied to the display apparatus 600 illustrated in FIG. 6, each of the first light shielding regions 332 of the first light shielding element 330 may be disposed on the optical path of each of the sub-image beams IB heading for each of the first connection portions 122, and each of the second light shielding regions 742 of the second light shielding element 740 may be disposed on the optical path of each of the sub-image beams IB passing through the optical inactive regions of the second connection portions 422b located on the second surfaces S2 of the optical regions 421. In this way, each of the sub-image beams IB traveling toward each of the first connection portions 422a is blocked by each of the first light shielding regions 332 and is prevented from passing through each of the first connection portions 422a, and each of the sub-image beams IB passing through the optical inactive region of each of the second connection portions 422b traveling toward the at least one eye EY of the user is blocked by each of the second light shielding regions 742 and is prevented from being transmitted to the at least one eye EY of the user. Thus, the user may be prevented from viewing the stray light to improve the image quality, such that the display apparatus 600 may achieve the functions and effects mentioned above. Other related details will not be repeatedly described hereinafter.

Figure 8:
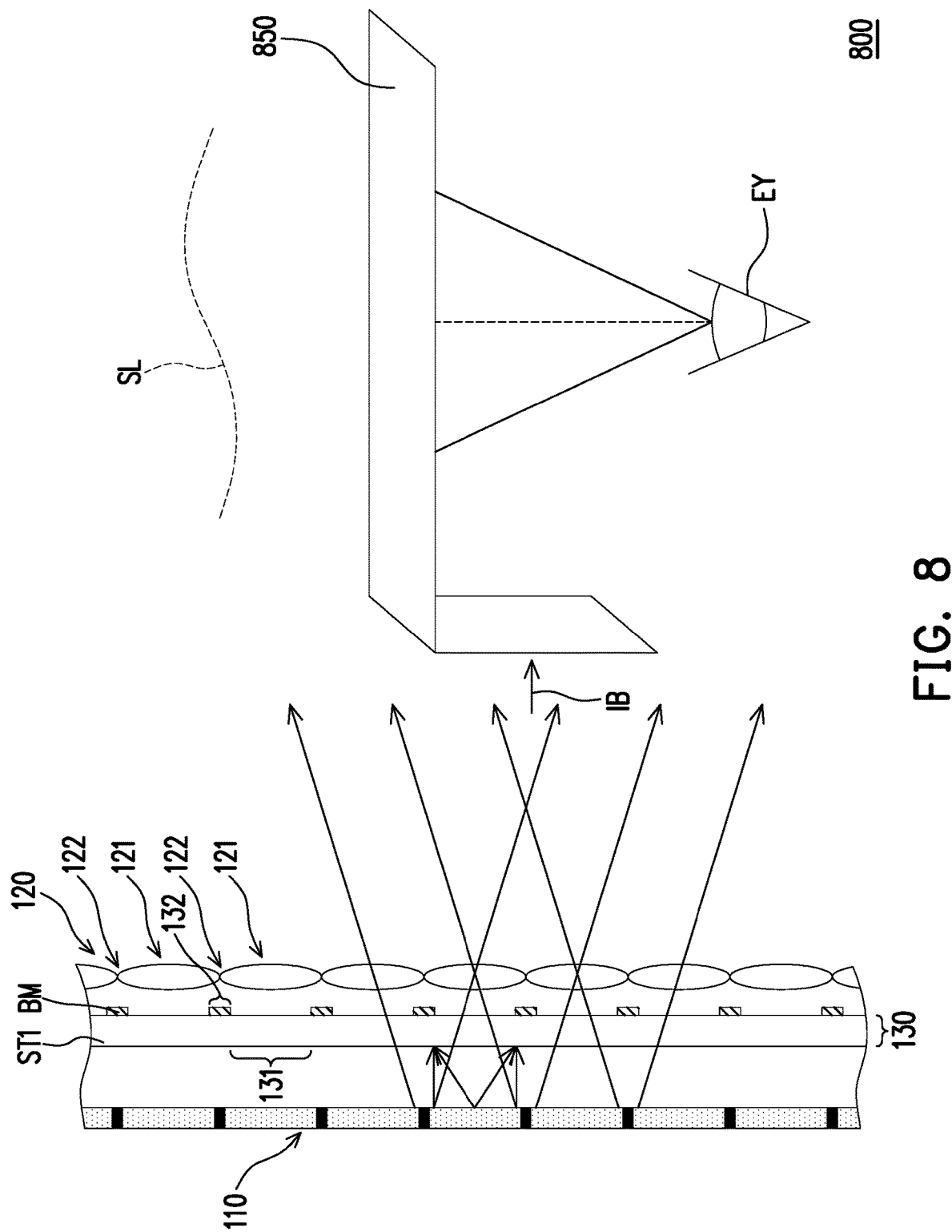
FIG. 8 is a schematic diagram illustrating an optical structure of a display apparatus according to another embodiment of the invention.

FIG. 8 is a schematic diagram illustrating an optical structure of a display apparatus according to another embodiment of the invention. Referring to FIG. 8, a display apparatus 800 illustrated in FIG. 8 is similar to the display apparatus 100 illustrated in FIG. 1, and the difference therebetween will be described below. The display apparatus 800 further includes at least one optical waveguide device 850 located between the micro lens array 120 and the at least one eye EY of the user. That is to say, in the present embodiment, the at least one optical waveguide device 850 is adapted to transmit an image beam to the at least one eye EY of the user. In addition, in the present embodiment, the at least one optical waveguide device 850 may allow an ambient beam SL to pass through and may be applied to a technical field related to the augmented reality (AR) display techniques.

Moreover, in the display apparatus 800, each of the first light shielding regions 132 may be disposed on the optical path of each of the sub-image beams IB heading for each of the first connection portions 122. In this way, each of the sub-image beams IB traveling toward each of the first connection portions 122 is blocked by each of the first light shielding regions 132 and prevented from passing through each of the first connection portions 122. In this way, each of the sub-image beams IB may be prevented from being refracted or scattered by the optical inactive regions of the first connection portions 122 to mitigate the occurrence of stray light to improve the image quality, such that the display apparatus 800 may achieve effects and advantages similar to the display apparatus 100 mentioned above. Other related details will not be repeatedly described hereinafter.

On the other hand, at least one optical waveguide device 850 may be additionally disposed in the display apparatus 600 described above to form a structure similar to that of the display apparatus 800 of the embodiment illustrated in FIG. 8 and achieve effects and advantages similar to the display apparatus 800 mentioned above, which will not be repeatedly described hereinafter.

FIG. 9A through FIG. 9F are schematic diagrams illustrating optical structures of different display apparatuses according to an embodiment of the invention. Referring to FIG. 9A through 9F, display apparatuses 900A, 900B, 900C, 900D, 900E and 900F of the embodiments illustrated in FIG. 9A through FIG. 9F are similar to the display apparatus 100 illustrated in FIG. 1, and the difference therebetween will be described below. The display apparatuses 900A, 900B, 900C, 900D, 900E and 900F further include optical lenses 960A, 960B, 960C, 960D, 960E and 960F, respectively, to have various optical properties, such that optical quality requirements and cost demands for various display screens may all be considered.

Figure 9A:
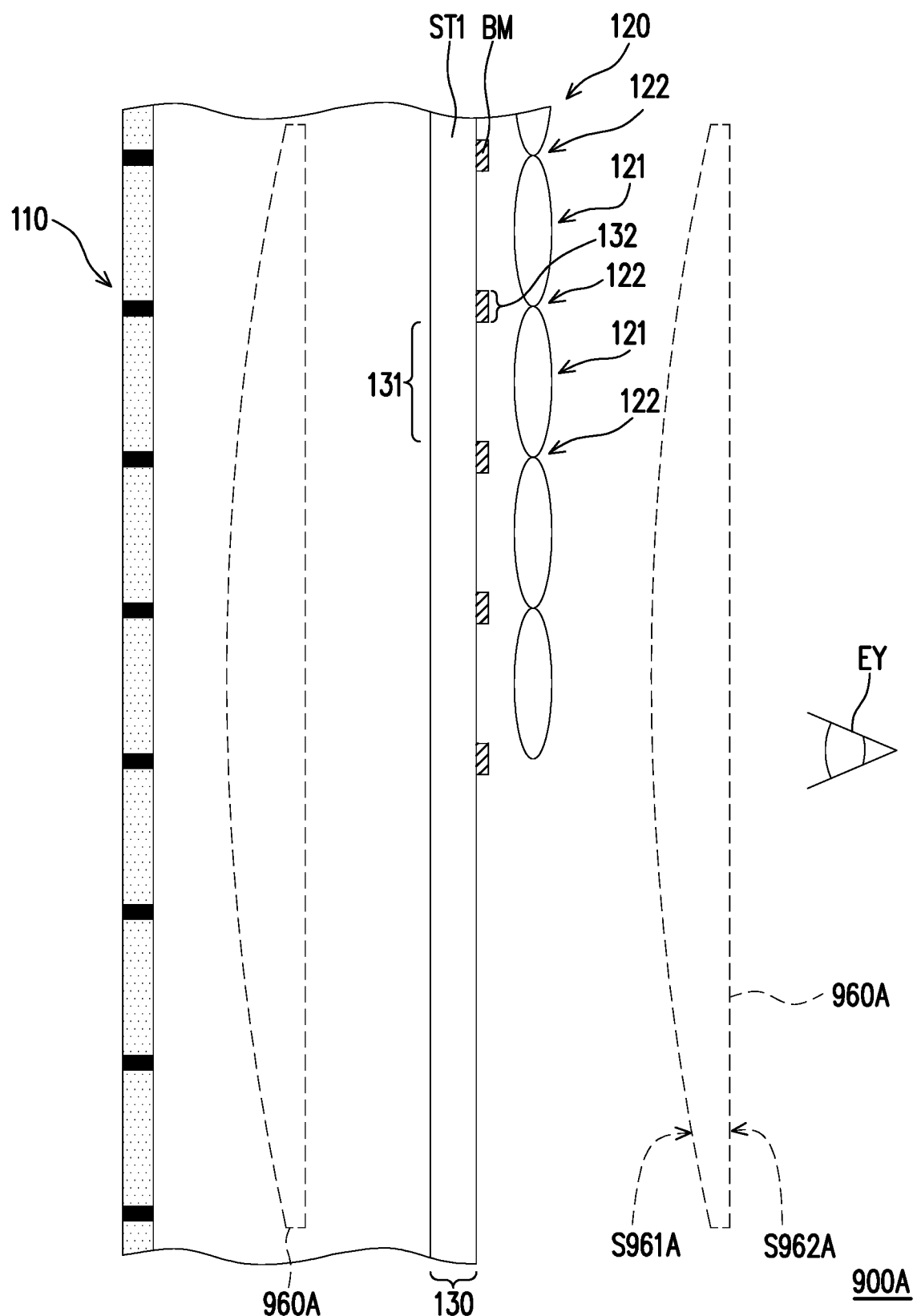
FIG. 9A through FIG. 9F are schematic diagrams illustrating optical structures of different display apparatuses according to an embodiment of the invention.

For example, as illustrated in FIG. 9A, in the embodiment illustrated in FIG. 9A, the optical lens 960A has two surfaces S961A and S962A, respectively, wherein the surface S961A faces the display element 110, and the surface S962A faces the eye EY Specifically, in the embodiment illustrated in FIG. 9A, the optical lens 960A is a plano-convex lens with a convex surface being spherical or aspherical and facing the display element 110. Namely, in the embodiment illustrated in FIG. 9A, the surface S961A is a convex surface. Meanwhile, as shown by the dashed lines in FIG. 9A, the optical lens 960A may be disposed between the display element 110 and the first light shielding element 130, or between the micro lens array 120 and the eye EY, but the invention is not limited thereto. In the embodiment illustrated in FIG. 9A, the optical lens 960A has a lower modulation transfer function (MTF) value with respect to an edge part in an MTF chart, which causes gradually increased edge chromatic aberration.

Figure 9B:
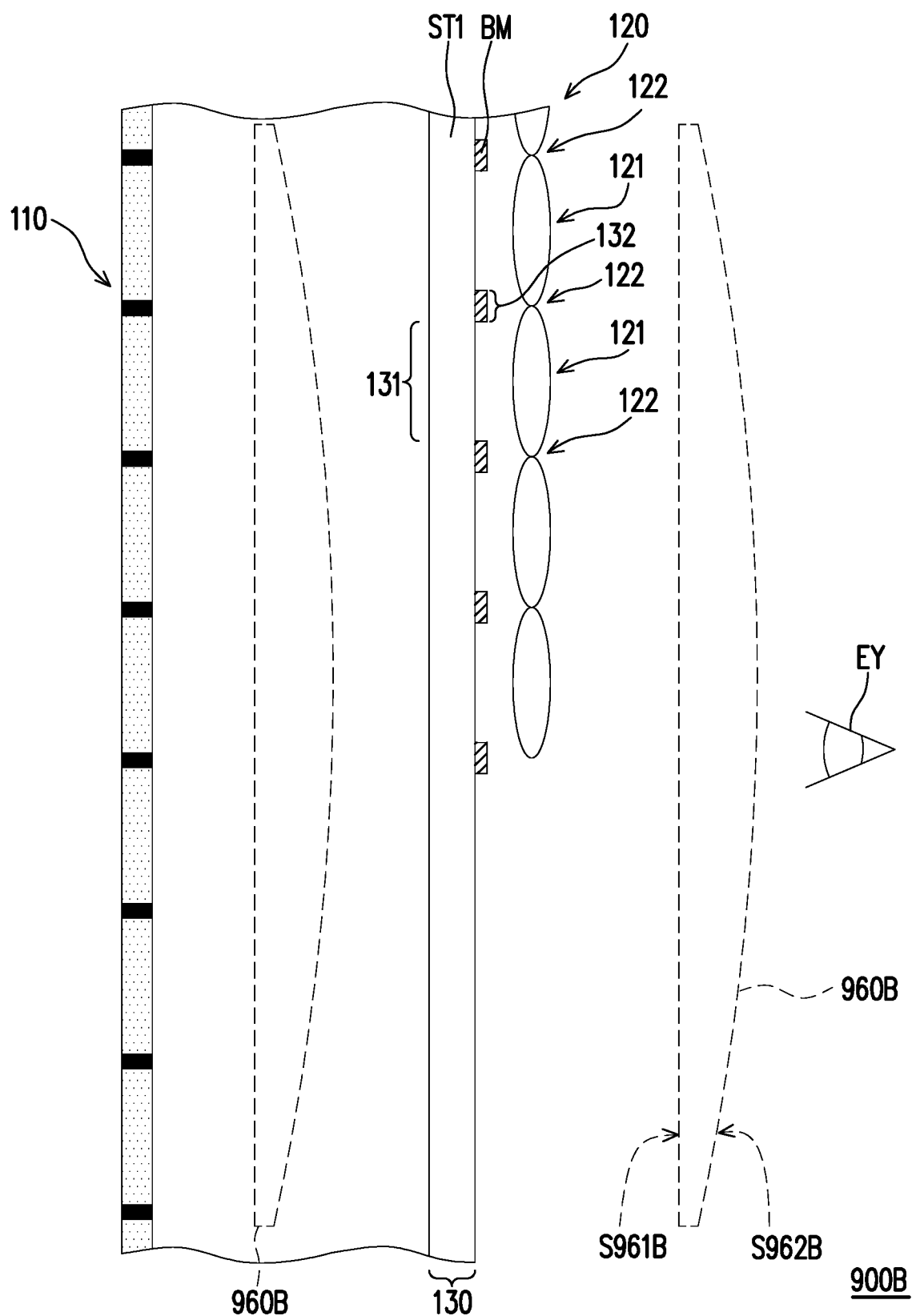

On the other hand, as illustrated in FIG. 9B, in the embodiment illustrated in FIG. 9B, the optical lens 960B has two surfaces S961B and S962B, respectively, wherein the surface S961B faces the display element 110, and the surface S962B faces the eye EY. Specifically, in the embodiment illustrated in FIG. 9B, the optical lens 960B is a convex-planar lens with a convex surface being spherical or aspherical and facing the eye EY. Namely, in the embodiment illustrated in FIG. 9B, the surface S961B is a convex surface. Meanwhile, as shown by the dashed lines in FIG. 9B, the optical lens 960B may be disposed between the display element 110 and the first light shielding element 130, or between the micro lens array 120 and the eye EY, but the invention is not limited thereto. In the embodiment illustrated in FIG. 9B, the optical lens 960B has a lower MTF value with respect to the edge part in the MTF chart, which causes gradually increased edge chromatic aberration.

Figure 9C:
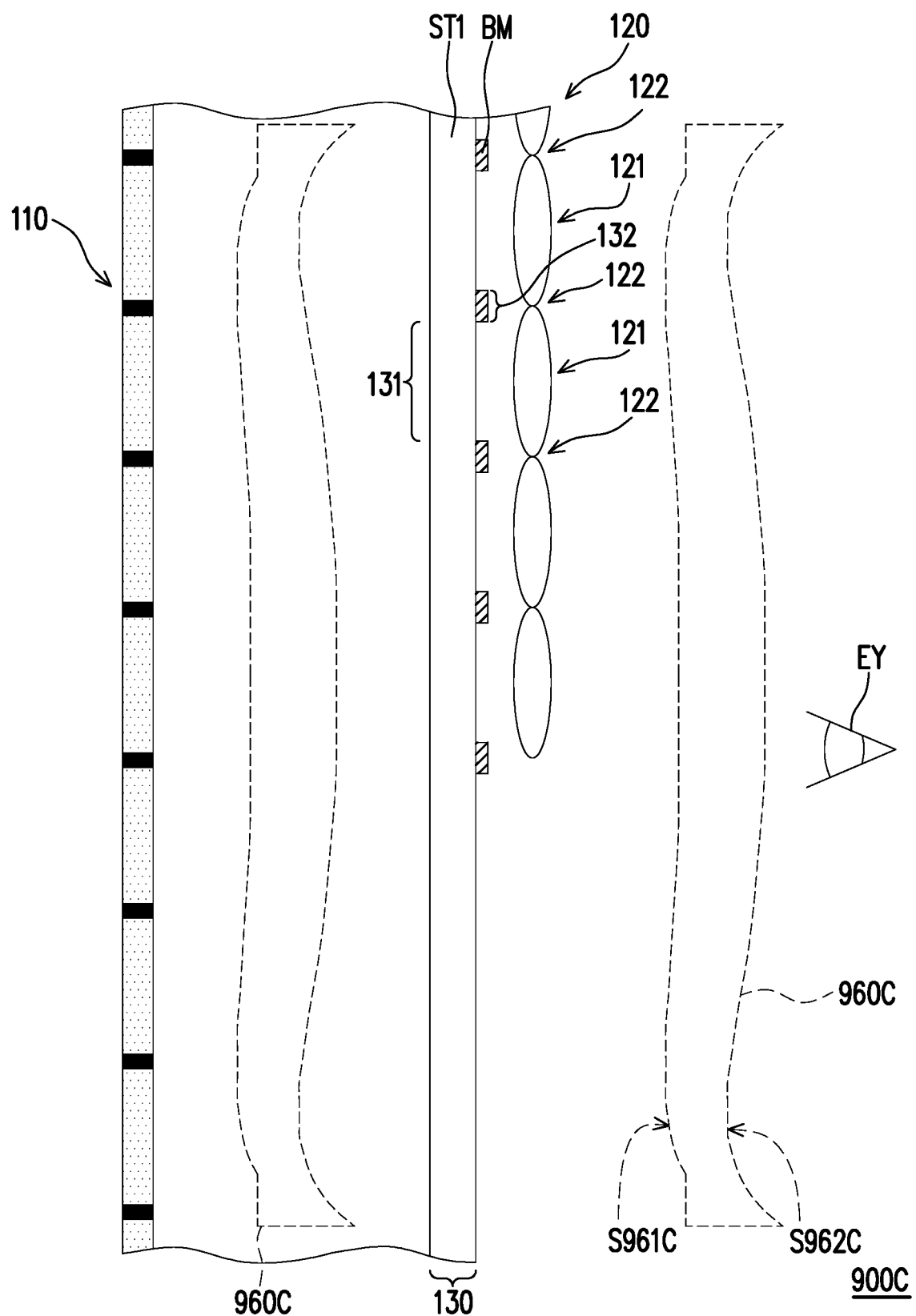

Then, referring to FIG. 9C, in the embodiment illustrated in FIG. 9C, the optical lens 960C has two surfaces S961C and S962C, respectively, wherein the surface S961C faces the display element 110, and the surface S962C faces the eye EY. Specifically, the optical lens 960C is a double-curvature lens, i.e., in the embodiment illustrated in FIG. 9C, both the surfaces S961C and S962C are curved surfaces and may be spherical or aspherical. Meanwhile, as shown by the dashed lines in FIG. 9C, the optical lens 960C may be disposed between the display element 110 and the first light shielding element 130, or between the micro lens array 120 and the eye EY, but the invention is not limited thereto.

Figure 9D:
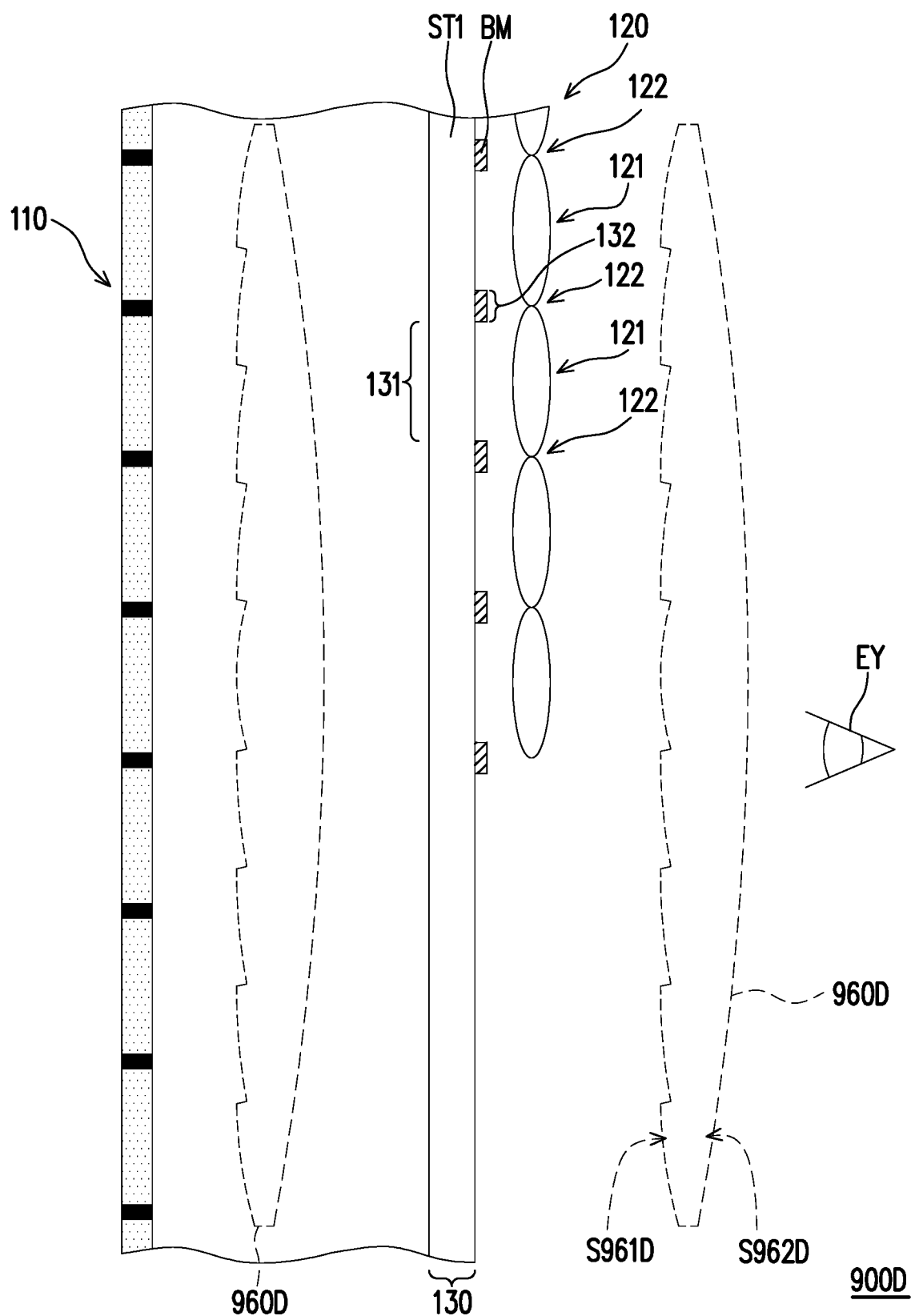

On the other hand, referring to FIG. 9D, in the embodiment illustrated in FIG. 9D, the optical lens 960D has two surfaces S961D and S962D, respectively, wherein the surface S961D faces the display element 110, and the surface S962D faces the eye EY. Specifically, the optical lens 960D is an optical lens having a convex surface and a diffractive optical element (DOE) optical surface. Specifically, referring to FIG. 9D, the surface S961D of the optical lens 960D facing the display element 110 is a DOE optical surface, and the surface S962D facing the eye EY is a convex surface, wherein the surface S962D may be spherical or aspherical. Meanwhile, as shown by the dashed lines in FIG. 9D, the optical lens 960D may be disposed between the display element 110 and the first light shielding element 130, or between the micro lens array 120 and the eye EY, but the invention is not limited thereto. In the embodiment illustrated in FIG. 9D, with the disposition of the DOE optical surface, the edge chromatic aberration may be eliminated by the optical lens 960D. With the disposition of the convex surface and the DOE optical surface, the optical lens 960D may increase its MTF value with respect to the edge part in the MTF chart.

Figure 9E:
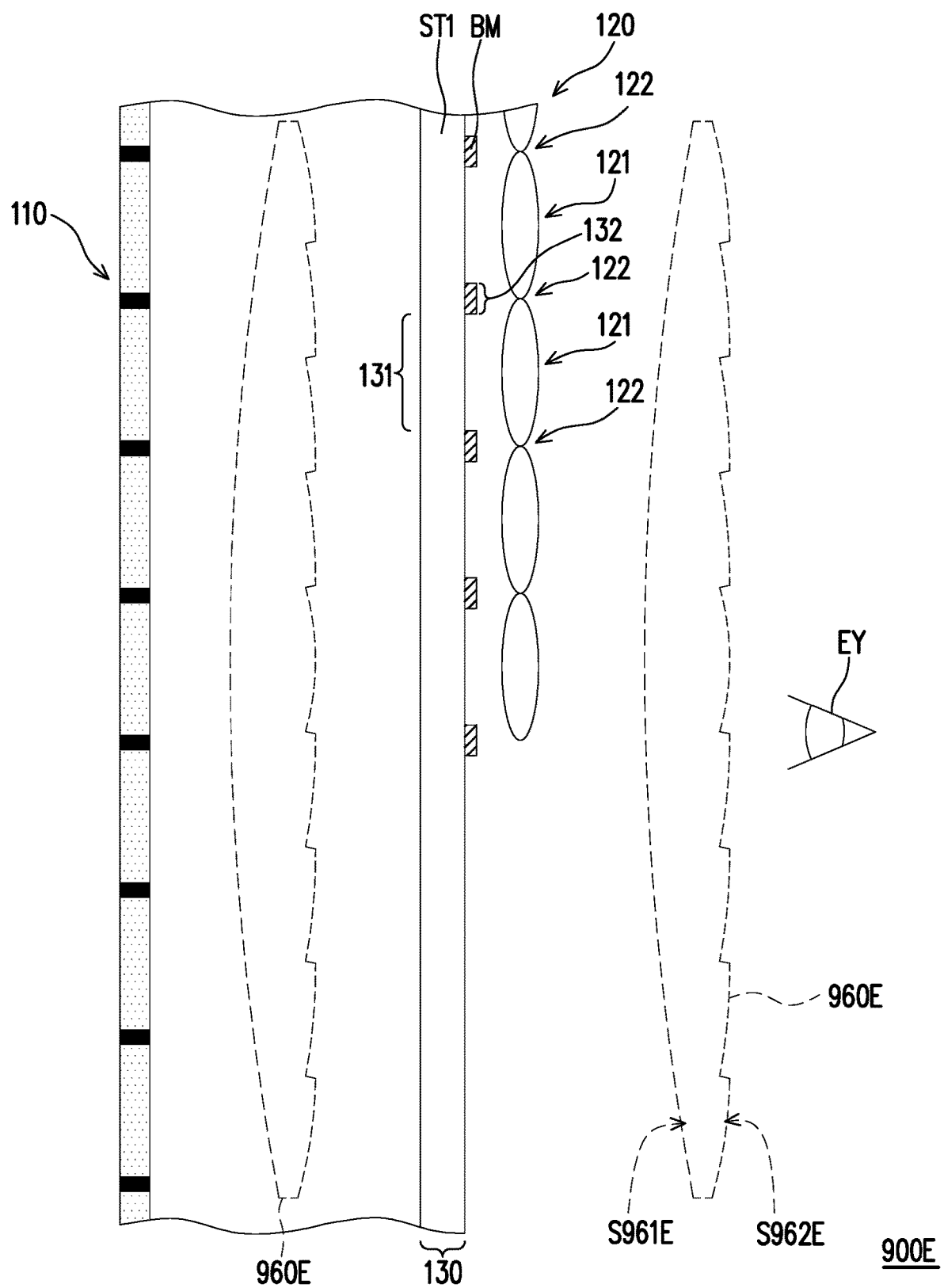

On the other hand, referring to FIG. 9E, in the embodiment illustrated in FIG. 9E, the optical lens 960E has two surfaces 5961E and S962E, respectively, wherein the surface 5961E faces the display element 110, and the surface S962 E faces the eye EY. Specifically, the optical lens 960E is also an optical lens having a convex surface and a DOE optical surface. Specifically, referring to FIG. 9E, the surface 5961E of the optical lens 960E facing the display element 110 is a convex surface and may be spherical or aspherical, and the surface S962E facing the eye EY is a DOE optical surface. Meanwhile, as shown by the dashed lines in FIG. 9E, the optical lens 960E may be disposed between the display element 110 and the first light shielding element 130, or between the micro lens array 120 and the eye EY, but the invention is not limited thereto. In the embodiment illustrated in FIG. 9E, with the disposition of the DOE optical surface, the edge chromatic aberration may be eliminated by the optical lens 960E. With the disposition of the convex surface and the DOE optical surface, the optical lens 960E may increase its MTF value with respect to the edge part in the MTF chart.

Moreover, in another embodiment, the DOE optical surface and the convex surface of an optical lens (not shown) may also be integrated on the same optical surface, i.e., the optical lens may have a planar surface and a hybrid optical surface including a convex surface with a DOE function, and may achieve the functions of the optical lens 960D and the optical lens 960E described above, which will not be repeated hereinafter.

Figure 9F:
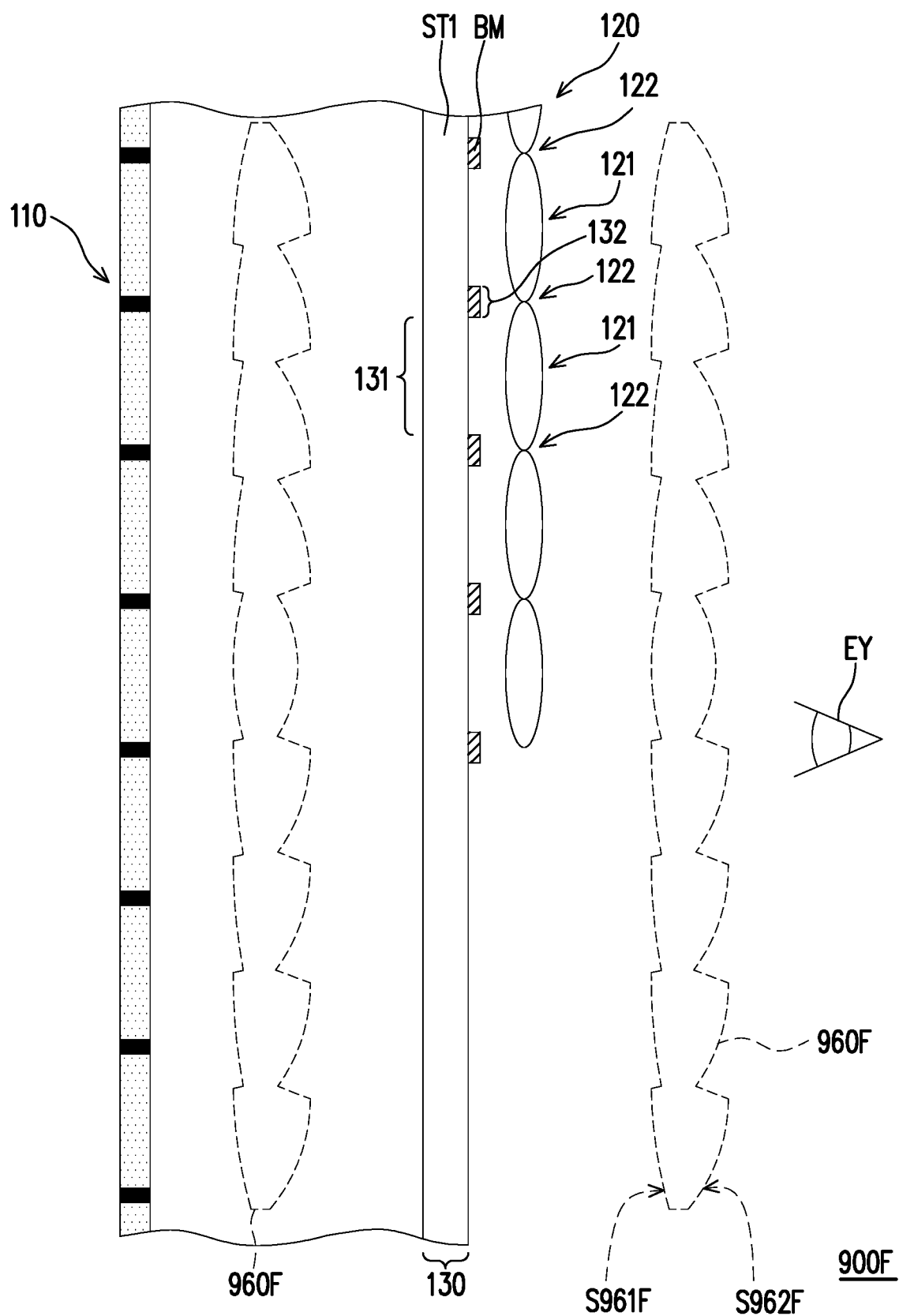

On the other hand, referring to FIG. 9F, the optical lens 960F has two surfaces S961F and S962F, respectively, wherein the surface S961F faces the display element 110, and the surface S962F faces the eye EY. Specifically, in the embodiment illustrated in FIG. 9F, the optical lens 960F is also an optical lens having a Fresnel optical surface and a DOE optical surface. The Fresnel optical surface of the optical lens 960F and the convex surfaces of the optical lenses 960E and 960D have the same function and may be used to replace the convex surfaces of the optical lenses 960D and 960E, thereby forming the optical lens 960F, such that the optical lens 960F may also achieve the functions of the optical lens 960D and the optical lens 960E described above. For example, referring to FIG. 9F, in the embodiment illustrated in FIG. 9F, the surface S961F of the optical lens 960F facing the display element 110 is a DOE optical surface, and the surface S962F facing the eye EY is a Fresnel optical surface. Meanwhile, with the disposition of the Fresnel optical surface of the optical lens 960F, the thickness size may be further reduced for the optical lens 960F to satisfy a miniaturization feature.

In this way, the display apparatuses 900A, 900B, 900C, 900D, 900E and 900F disposed with the optical lenses 960A, 960B, 960C, 960D, 960E and 960F may have various optical properties, such that optical quality requirements and cost demands for various display screens may all be considered. Meanwhile, in the display apparatuses 900A, 900B, 900C, 900D, 900E and 900F, each of the first light shielding regions 132 may be disposed on the optical path of each of the sub-image beams IB heading for each of the first connection portions 122. In this way, each of the sub-image beams IB traveling toward each of the first connection portions 122 is blocked by each of the first light shielding regions 132 and is prevented from passing through each of the first connection portions 122. In this way, each of the sub-image beams IB may be prevented from being refracted or scattered by the optical inactive regions of the first connection portions 122, such that the occurrence of stray light may be mitigated to improve the image quality and achieve effects and advantages similar to those of the display apparatus 100 described above, which will not be repeated hereinafter.

Based on the above, the embodiments of the invention can achieve at least one of the following advantages or effects. In the embodiments of the invention, in the display apparatus, each of the first light shielding regions can be disposed on the optical path of each of the sub-image beams heading for each of the first connection portions. Thereby, each of the sub-image beams traveling toward each of the first connection portions can be blocked by each of the first light shielding regions and be prevented from passing through each of the first connection portions. In this way, each of the sub-image beams can be prevented from being refracted or scattered by the optical inactive regions of the first connection portions, such that the occurrence of stray light can be mitigated to improve the image quality. Moreover, the display apparatus can further improve the image quality by the additionally disposed second light shielding regions.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, adapted to be disposed in front of at least one eye of a user, comprising:
a display element, configured to provide a plurality of sub-image beams;
a micro lens array, located in a transmission path of the sub-image beams, and having a plurality of optical regions and a plurality of first connection portions, wherein each of the first connecting portions is adapted to connect at least two adjacent ones of the optical regions, and each of the optical regions is adapted to allow each of the sub-image beams to penetrate; and
a first light shielding element, located between the display element and the micro lens array, and having a plurality of first light shielding regions and a plurality of first light transmission regions, wherein each of the first light transmission regions is disposed corresponding to each of the optical regions and is adapted to allow each of the sub-image beams to pass through, and each of the first light-shielding regions is disposed corresponding to each of the first connecting portions and is adapted to prevent each adjacent sub-image beams from passing through each of the first connecting portions,
wherein each of the optical regions has a first surface and a second surface opposite to each other, the first surface faces the display element, the micro lens array further has a plurality of second connection portions, each of the first connecting portions is adapted to connect the first surfaces of at least two adjacent ones of the optical regions, each of the second connecting portions is adapted to connect the second surfaces of at least two adjacent ones of the optical regions, and the first surface and the second surface are curved surfaces respectively,
a second light shielding element, located between the micro lens array and the at least one eye of the user, and disposed between the second surface of the optical regions and the at least one eye of the user, the second light shielding element having a plurality of second light shielding regions and a plurality of second light transmission regions, wherein each of the second light transmission regions is disposed corresponding to each of the optical regions and is adapted to allow each of the sub-image beams to pass through, and each of the second light shielding regions is adapted to prevent each of the sub-image beams passing through each of the second connection portions from being transmitted to the at least one eye of the user,
wherein the sub-image beams provided by the display element sequentially pass through the plurality of first light transmission regions of the first light shielding element, the plurality of optical regions of the micro lens array and the plurality of second light transmission regions of the second light shielding element.

2. The display apparatus according to claim 1, wherein the first light shielding regions are located on a surface of the first light shielding element facing the micro lens array.

3. The display apparatus according to claim 1, wherein there is a plurality of first pitches between the first connection portions, there is a plurality of second pitches between the second connection portions, the first pitches are the same as each other, the second pitches are the same as each other, and each of the first pitches and each of the second pitches are different from each other.

4. The display apparatus according to claim 1, wherein there is a plurality of first pitches between the first connection portions, there is a plurality of second pitches between the second connection portions, and at least a part of the first pitches are different from each other, or at least a part of the second pitches are different from each other.

5. The display apparatus according to claim 1, wherein each of the first light shielding regions is disposed corresponding to each of the first connection portions and each of the second connection portions and is adapted to prevent each of adjacent sub-image beams from passing through each of the first connection portions and each of the second connection portions.

6. The display apparatus according to claim 1, wherein the first light shielding element further comprises a plurality of second light shielding regions, and each of the second light shielding regions is located on a surface of the first light shielding element facing the micro lens array and is disposed corresponding to each of the second connecting portions to be adapted to prevent each of the sub-image beams from passing through each of the second connecting portions.

7. The display apparatus according to claim 6, wherein there is a third pitch between the adjacent first light shielding regions, wherein the second light shielding region is located between the two first light shielding regions and is apart from the more adjacent one of the first light shielding regions by has a fourth pitch, and the fourth pitch is less than one third of the third pitch.

8. The display apparatus according to claim 6, wherein each of the first light shielding regions has a first lateral displacement with respect to the corresponding first connection portion in a direction far away from a main optical axis, a size of the first lateral displacement is smaller than one third of the first pitch between the corresponding first connection portion and the adjacent first connection portion, each of the second light shielding regions has a second lateral displacement with respect to the corresponding second connection portion in a direction close to the main optical axis, and a size of the second lateral displacement is smaller than one third of the second pitch between the corresponding second connection portion and the adjacent second connection portion, wherein a direction of the main optical axis is an extending direction of a central line of a view angle of the display apparatus.

9. The display apparatus according to claim 6, wherein each of the first light-shielding regions has a first width, the first width is smaller than one third of the first pitch between the corresponding first connection portion and the adjacent first connection portion, each of the second light-shielding regions has a second width, and the second width is smaller than one third of the second pitch between the corresponding second connection portion and the adjacent second connection portion.

10. The display apparatus according to claim 6, wherein the first light shielding element comprises a light-transmissive first substrate and a light-absorbing material, the light-absorbing material is disposed corresponding to the first light shielding regions and the second light shielding regions to form a plurality of first light shielding portions in the first light shielding regions and form a plurality of second light shielding portions in the second light shielding regions, and regions of the first substrate on which the light-absorbing material does not cover form a plurality of first light transmission portions in the first light transmission regions.

11. The display apparatus according to claim 6, wherein the first light shielding element comprises an opaque first substrate, the first substrate has a plurality of through holes, the through holes are disposed corresponding to the first light shielding regions to form a plurality of first light transmission portions in the first light shielding regions, and a body of the first substrate forms a plurality of first light shielding portions in the first light shielding regions and a plurality of second light shielding portions in the second light shielding regions.

12. The display apparatus according to claim 1, wherein the second light shielding regions are located on a surface of the second light shielding element facing the micro lens array.

13. The display apparatus according to claim 1, wherein each of the first connection portions corresponds to each of the second connection portions, each of the first light shielding regions corresponds to each of the second light shielding regions, each of the second light shielding regions has a third lateral displacement with respect to the corresponding first connection portion in a direction far away from a main optical axis, and a size of the third lateral displacement is smaller than one third of the first pitch between the corresponding first connection portion and the adjacent first connection portion, wherein a direction of the main optical axis is an extending direction of a central line of a view angle of the display apparatus.

14. The display apparatus according to claim 1, wherein at least a part of each of the second light shielding regions overlaps with the corresponding first light shielding region.

15. The display apparatus according to claim 1, wherein each of the first light-shielding regions has a first width, the first width is smaller than one third of the first pitch between the corresponding first connection portion and the adjacent first connection portion, each of the second light-shielding regions has a second width, and the second width is smaller than one third of the second pitch between the corresponding second connection portion and the adjacent second connection portion.

16. The display apparatus according to claim 1, wherein the second light shielding element comprises a light-transmissive second substrate and a light-absorbing material, the light-absorbing material is disposed corresponding to the second light shielding regions to form a plurality of second light shielding portions in the second light shielding regions, and regions of the second substrate on which the light-absorbing material does not cover form a plurality of second light transmission portions in the second light transmission regions.

17. The display apparatus according to claim 1, wherein the second light shielding element comprises an opaque second substrate, the second substrate has a plurality of through holes, the through holes are disposed corresponding to the second light shielding regions to form a plurality of second light transmission portions in the second light shielding regions, and a body of the second substrate forms a plurality of second light shielding portions in the second light shielding regions.

18. The display apparatus according to claim 1, wherein each of the first light-shielding regions has a first width, the first width is smaller than one third of the first pitch between the corresponding first connection portion and the adjacent first connection portion.

19. The display apparatus according to claim 1, wherein each of the first light shielding regions has a first lateral displacement with respect to the corresponding first connection portion in a direction far away from a main optical axis, and a size of the first lateral displacement is smaller than one third of the first pitch between the corresponding first connection portion and the adjacent first connection portion, wherein a direction of the main optical axis is an extending direction of a central line of a view angle of the display apparatus.

20. The display apparatus according to claim 1, wherein the first light shielding element comprises a light-transmissive first substrate and a light-absorbing material, the light-absorbing material is disposed corresponding to the first light shielding regions to form a plurality of first light shielding portions in the first light shielding regions, and regions of the first substrate on which the light-absorbing material does not cover form a plurality of first light transmission portions in the first light transmission regions.

21. The display apparatus according to claim 1, wherein the first light shielding element comprises an opaque first substrate, the first substrate has a plurality of through holes, the through holes are disposed corresponding to the first light shielding regions to form a plurality of first light transmission portions in the first light shielding regions, and a body of the first substrate forms a plurality of first light shielding portions in the first light shielding regions.

22. The display apparatus according to claim 1, wherein the first light shielding regions formed corresponding to the first connection portions of the micro lens array form a mesh shape, and the first light shielding regions are arranged in a manner of being gradually thickened outward from a central area of the first light shielding element.

23. A display apparatus, adapted to be disposed in front of at least one eye of a user, comprising:
   a display element, configured to provide a plurality of sub-image beams;
   a micro lens array, located in a transmission path of the sub-image beams, and having a plurality of optical regions and a plurality of first connection portions, wherein each of the first connecting portions is adapted to connect at least two adjacent ones of the optical regions, and each of the optical regions is adapted to allow each of the sub-image beams to penetrate; and
   a first light shielding element, located between the display element and the micro lens array, and having a plurality of first light shielding regions and a plurality of first light transmission regions, wherein each of the first light transmission regions is disposed corresponding to each of the optical regions and is adapted to allow each of the sub-image beams to pass through, and each of the first light-shielding regions is disposed corresponding to each of the first connecting portions and is adapted to prevent each adjacent sub-image beams from passing through each of the first connecting portions,
   wherein each of the optical regions has a first surface and a second surface opposite to each other, the first surface faces the display element, the micro lens array further has a plurality of second connection portions, each of the first connecting portions is adapted to connect the first surfaces of at least two adjacent ones of the optical regions, and each of the second connecting portions is adapted to connect the second surfaces of at least two adjacent ones of the optical regions, wherein the first light shielding element further comprises a plurality of second light shielding regions, and each of the second light shielding regions is located on a surface of the first light shielding element facing the micro lens array and is disposed corresponding to each of the second connecting portions to be adapted to prevent each of the sub-image beams from passing through each of the second connecting portions, and wherein the first light shielding regions and the second light shielding regions overlap with each other in a central area of the first light shielding element, and the gaps between the first light shielding regions and the second light shielding regions are gradually enlarged along a vertical direction or a horizontal direction.

24. A display apparatus, adapted to be disposed in front of at least one eye of a user, comprising:

a display element, configured to provide a plurality of sub-image beams;

a micro lens array, located in a transmission path of the sub-image beams, and having a plurality of optical regions and a plurality of first connection portions, wherein each of the first connecting portions is adapted to connect at least two adjacent ones of the optical regions, and each of the optical regions is adapted to allow each of the sub-image beams to penetrate; and a first light shielding element, located between the display element and the micro lens array, and having a plurality of first light shielding regions and a plurality of first light transmission regions, wherein each of the first light transmission regions is disposed corresponding to each of the optical regions and is adapted to allow each of the sub-image beams to pass through, and each of the first light-shielding regions is disposed corresponding to each of the first connecting portions and is adapted to prevent each adjacent sub-image beams from passing through each of the first connecting portions;

a second light shielding element, located between the micro lens array and the at least one eye of the user, and disposed between the second surface of the optical regions and the at least one eye of the user, the second light shielding element having a plurality of second light shielding regions and a plurality of second light transmission regions, wherein each of the second light transmission regions is disposed corresponding to each of the optical regions and is adapted to allow each of the sub-image beams to pass through, and each of the second light shielding regions is adapted to prevent each of the sub-image beams passing through each of the second connection portions from being transmitted to the at least one eye of the user, wherein the sub-image beams provided by the display element sequentially pass through the plurality of first light transmission regions of the first light shielding element, the plurality of optical regions of the micro lens array and the plurality of second light transmission regions of the second light shielding element, wherein the display apparatus further comprises at least one optical lens, and the at least one optical lens is at least disposed between the display element and the first light shielding element, or disposed at a side of the micro lens array away from the display element.

* * * * *